United States Patent
Moteki et al.

(10) Patent No.: US 11,176,661 B2
(45) Date of Patent: Nov. 16, 2021

(54) IMAGE PROCESSING APPARATUS AND IMAGE PROCESSING METHOD

(71) Applicant: FUJITSU LIMITED, Kawasaki (JP)

(72) Inventors: Atsunori Moteki, Inagi (JP); Toshiyuki Yoshitake, Kawasaki (JP); Yu Ishikawa, Yokohama (JP); Yasuto Watanabe, Machida (JP)

(73) Assignee: FUJITSU LIMITED, Kawasaki (JP)

(*) Notice: Subject to any disclaimer, the term of this patent is extended or adjusted under 35 U.S.C. 154(b) by 210 days.

(21) Appl. No.: 16/660,850

(22) Filed: Oct. 23, 2019

(65) Prior Publication Data

US 2020/0134801 A1 Apr. 30, 2020

(30) Foreign Application Priority Data

Oct. 30, 2018 (JP) .............................. JP2018-203641

(51) Int. Cl.
*G06K 9/00* (2006.01)
*G06T 7/00* (2017.01)
(Continued)

(52) U.S. Cl.
CPC ................ *G06T 7/001* (2013.01); *G06K 9/03* (2013.01); *G06K 9/4638* (2013.01);
(Continued)

(58) Field of Classification Search
CPC .. G06T 7/001; G06T 7/32; G06T 7/74; G06T 2207/30244; G06T 7/0004; G06T 7/0006;
(Continued)

(56) References Cited

U.S. PATENT DOCUMENTS

2003/0023334 A1* 1/2003 Miyazaki ......... G05B 19/41865
700/96
2007/0182739 A1 8/2007 Platonov et al.
(Continued)

FOREIGN PATENT DOCUMENTS

| JP | 2007-207251 | 8/2007 |
|---|---|---|
| JP | 2009-210403 | 9/2009 |
| JP | 2017-068849 | 4/2017 |

OTHER PUBLICATIONS

R. G. Gioi et al., "LSD: a Line Segment Detector", Image Processing On Line, 2 (2012), pp. 35-55, Mar. 2012.
(Continued)

*Primary Examiner* — Samir A Ahmed
(74) *Attorney, Agent, or Firm* — Fujitsu Patent Center

(57) ABSTRACT

A memory stores shape information representing a shape of an object. A processor detects a plurality of feature lines from an image of an object that has been captured by an image capturing device in a manufacturing process of manufacturing the object, and produces a plurality of combinations by correlating each of a plurality of line segments in the shape information and each of the plurality of feature lines with each other. Next, the processor performs classification of each of the combinations into an identified combination that has a certain correlation result or an unidentified combination that has an uncertain correlation result. The processor also changes a result of the classification for the identified combination and the unidentified combination according to a reliability of each of the plurality of combinations and determines a degree of progress of the manufacturing process by using the identified combination included in the changed result.

15 Claims, 18 Drawing Sheets

(51) Int. Cl.
   *G06K 9/46*    (2006.01)
   *G06K 9/03*    (2006.01)
   *G06T 7/32*    (2017.01)
   *G06T 7/73*    (2017.01)
   *G06K 9/62*    (2006.01)

(52) U.S. Cl.
   CPC .............. *G06K 9/6267* (2013.01); *G06T 7/32* (2017.01); *G06T 7/74* (2017.01)

(58) Field of Classification Search
   CPC .......... G06T 7/75; G06K 9/4638; G06K 9/03; G06K 9/6267; G06K 9/6215; G06K 2209/40; G06K 2209/19
   See application file for complete search history.

(56) References Cited

U.S. PATENT DOCUMENTS

| | | | | |
|---|---|---|---|---|
| 2009/0263024 | A1* | 10/2009 | Yamaguchi | G06T 11/206 382/199 |
| 2012/0057776 | A1* | 3/2012 | Tao | G06T 7/536 382/154 |
| 2017/0132752 | A1* | 5/2017 | Aoyagi | G06T 19/20 |
| 2017/0287154 | A1* | 10/2017 | Yamaguchi | G06T 7/73 |
| 2019/0164010 | A1* | 5/2019 | Ma | G06K 9/00711 |

OTHER PUBLICATIONS

C. Xu et al.,"Pose Estimation from Line Correspondences: A Complete Analysis and a Series of Solutions", IEEE Transactions on Pattern Analysis and Machine Intelligence, vol. 39, No. 6, pp. 1209-1222, Jun. 2017.

Z. Zhang, "A Flexible New Technique for Camera Calibration", IEEE Transactions on Pattern Analysis and Machine Intelligence, vol. 22, No. 11, pp. 1330-1334, Nov. 2000.

P. Meer et al. ."Robust Regression Methods for Computer Vision: A Review", International Journal of Computer Vision, vol. 6, Issue 1, pp. 59-70, Apr. 1991.

L. G. Roberts,"Machine perception of three-dimensional solids", MIT Lincoln Lab. Rep., TR3315, pp. 1-82, May 1963.

* cited by examiner

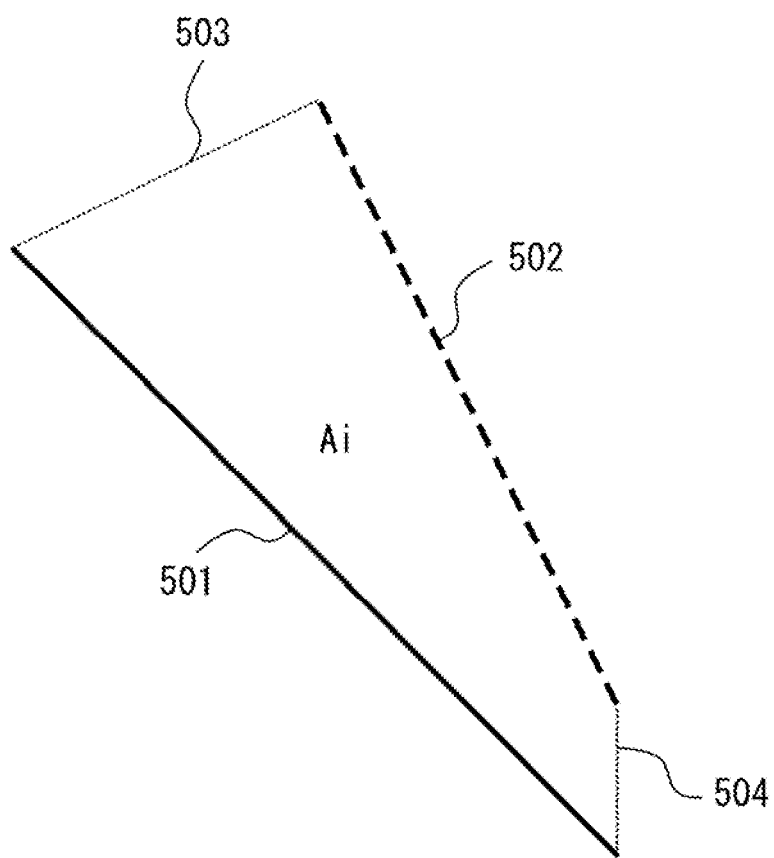
F I G. 5

| LINE-SEGMENT ID | LINE-SEGMENT COORDINATES | FEATURE-LINE COORDINATES | CORRELATION RESULT | DEGREE OF IDENTIFICATION | RELIABILITY |
|---|---|---|---|---|---|
| 1 | (40, -44.5, 20), (40, 44.5, 20) | (198.0, 441.9), (177.4, 262.0) | CORRECT CORRELATION | IDENTIFIED COMPONENT | 0.5 (INITIAL VALUE) |
| 2 | (40, -44.5, -20), (40, 44.5, -20) | (249.0, 385.8), (240.1, 220.9) | CORRECT CORRELATION | IDENTIFIED COMPONENT | 0.5 (INITIAL VALUE) |
| 3 | (-40, -44.5, 20), (40, -44.5, 20) | (67.6, 382.8), (198.0, 441.9) | (HIDDEN LINE) | --- | --- |
| 4 | (6, -28.5, 20), (40, 44.5, 20) | (133.8, 388.0), (177.4, 262.0) | (HIDDEN LINE) | --- | --- |
| 5 | (-40, -44.5, -20), (40, -44.5, -20) | (127.0, 388.8), (249.0, 385.8) | MISTAKE IN CORRELATION | IDENTIFIED COMPONENT | 0.5 (INITIAL VALUE) |
| 6 | (6, -28.5, -20), (40, 44.5, -20) | (191.1, 339.3), (240.1, 220.9) | MISTAKE IN MANUFACTURE | IDENTIFIED COMPONENT | 0.5 (INITIAL VALUE) |
| 7 | (-40, -7.5, 20), (6, -28.5, 20) | (52.3, 320.4), (133.8, 388.0) | UNIDENTIFIED PAIR | UNIDENTIFIED COMPONENT | 0.5 (INITIAL VALUE) |
| 8 | (-40, -7.5, -20), (6, -28.5, -20) | (116.9, 280.7), (191.1, 339.3) | CORRECT CORRELATION | IDENTIFIED COMPONENT | 0.5 (INITIAL VALUE) |
| 9 | (40, -44.5, -20), (40, -44.5, 20) | (249.0, 385.8), (198.0, 441.9) | CORRECT CORRELATION | IDENTIFIED COMPONENT | 0.5 (INITIAL VALUE) |
| 10 | (-40, -7.5, -20), (-40, -7.5, 20) | (116.9, 280.7), (52.3, 320.4) | (HIDDEN LINE) | --- | --- |
| 11 | (6, -28.5, -20), (6, -28.5, 20) | (249.0, 385.8), (198.0, 441.9) | UNIDENTIFIED PAIR | UNIDENTIFIED COMPONENT | 0.5 (INITIAL VALUE) |
| 12 | (-40, -44.5, -20), (-40, -44.5, 20) | --- | --- | --- | --- |
| 13 | (-40, -44.5, 20), (-40, -7.5, 20) | --- | --- | --- | --- |
| 14 | (-40, -44.5, -20), (-40, -7.5, -20) | --- | --- | --- | --- |
| 15 | (40, -7.5, 20), (6, 28.5, 20) | --- | (HIDDEN LINE) | --- | --- |

| LINE-SEGMENT ID | LINE-SEGMENT COORDINATES | FEATURE-LINE COORDINATES | CORRELATION RESULT | DEGREE OF IDENTIFICATION | RELIABILITY |
|---|---|---|---|---|---|
| 1 | (40, -44.5, 20), (40, 44.5, 20) | (198.0, 441.9), (177.4, 262.0) | CORRECT CORRELATION | IDENTIFIED COMPONENT | 0.62 (=σ(1)) |
| 2 | (40, -44.5, -20), (40, 44.5, -20) | (249.0, 385.8), (240.1, 220.9) | CORRECT CORRELATION | IDENTIFIED COMPONENT | 0.62 (=σ(1)) |
| 3 | (-40, -44.5, 20), (-40, -44.5, 20) | (67.6, 382.8), (198.0, 441.9) | (HIDDEN LINE) | ------ | ------ |
| 4 | (6, -28.5, 20), (40, 44.5, 20) | (133.8, 388.0), (177.4, 262.0) | (HIDDEN LINE) | ------ | ------ |
| 5 | (-40, -44.5, -20), (40, -44.5, -20) | (127.0, 388.8), (249.0, 385.8) | MISTAKE IN CORRELATION | IDENTIFIED COMPONENT | 0.62 (=σ(1)) |
| 6 | (6, -28.5, -20), (40, -44.5, -20) | (191.1, 339.3), (240.1, 220.9) | MISTAKE IN MANUFACTURE | IDENTIFIED COMPONENT | 0.62 (=σ(1)) |
| 7 | (-40, -7.5, 20), (6, -28.5, 20) | (52.3, 320.4), (133.8, 388.0) | UNIDENTIFIED PAIR | UNIDENTIFIED COMPONENT | 0.37 (=σ(-1)) |
| 8 | (-40, -7.5, -20), (6, -28.5, -20) | (116.9, 280.7), (191.1, 339.3) | CORRECT CORRELATION | IDENTIFIED COMPONENT | 0.62 (=σ(1)) |
| 9 | (40, -44.5, -20), (40, -44.5, -20) | (249.0, 385.8), (198.0, 441.9) | CORRECT CORRELATION | IDENTIFIED COMPONENT | 0.62 (=σ(1)) |
| 10 | (-40, -7.5, -20), (-40, 7.5, 20) | (116.9, 280.7), (52.3, 320.4) | (HIDDEN LINE) | ------ | ------ |
| 11 | (6, -28.5, -20), (6, -28.5, -20) | (249.0, 385.8), (198.0, 441.9) | UNIDENTIFIED PAIR | UNIDENTIFIED COMPONENT | 0.37 (=σ(-1)) |
| 12 | (-40, -44.5, -20), (-40, -44.5, 20) | ------ | ------ | ------ | ------ |
| 13 | (-40, -44.5, 20), (-40, -7.5, 20) | ------ | ------ | ------ | ------ |
| 14 | (-40, -44.5, -20), (-40, -7.5, -20) | ------ | ------ | ------ | ------ |
| 15 | (40, -7.5, -20), (6, 28.5, 20) | ------ | (HIDDEN LINE) | ------ | ------ |

| LINE-SEGMENT ID | LINE-SEGMENT COORDINATES | PART ID | FEATURE-LINE COORDINATES | CORRELATION RESULT | DEGREE OF IDENTIFICATION | RELIABILITY |
|---|---|---|---|---|---|---|
| 1 | (40, -44.5, 20), (40, 44.5, -20) | G1 | (198.0, 441.9), (177.4, 262.0) | CORRECT CORRELATION | IDENTIFIED COMPONENT | 0.73 (=σ(2)) |
| 2 | (40, -44.5, -20), (40, 44.5, -20) | G1 | (249.0, 385.8), (240.1, 220.9) | CORRECT CORRELATION | IDENTIFIED COMPONENT | 0.73 (=σ(2)) |
| 3 | (-40, -44.5, 20), (40, -44.5, 20) | G1 | (67.6, 382.8), (198.0, 441.9) | (HIDDEN LINE) | ---------- | ---------- |
| 4 | (6, -28.5, 20), (40, 44.5, 20) | G1 | (133.8, 388.0), (177.4, 262.0) | (HIDDEN LINE) | ---------- | ---------- |
| 5 | (-40, -44.5, -20), (40, -44.5, -20) | G1 | (127.0, 388.8), (249.0, 385.8) | MISTAKE IN CORRELATION | IDENTIFIED COMPONENT | 0.73 (=σ(2)) |
| 6 | (6, -28.5, -20), (40, 44.5, -20) | G1 | (191.1, 339.3), (240.1, 220.9) | MISTAKE IN MANUFACTURE | IDENTIFIED COMPONENT | 0.73 (=σ(2)) |
| 7 | (-40, -7.5, 20), (6, -28.5, 20) | G2 | (52.3, 320.4), (133.8, 388.0) | UNIDENTIFIED PAIR | UNIDENTIFIED COMPONENT | 0.50 (=σ(0)) |
| 8 | (-40, -7.5, -20), (6, -28.5, -20) | G2 | (116.9, 280.7), (191.1, 339.3) | CORRECT CORRELATION | IDENTIFIED COMPONENT | 0.50 (=σ(0)) |
| 9 | (40, -44.5, -20), (40, -44.5, 20) | G2 | (249.0, 385.8), (198.0, 441.9) | CORRECT CORRELATION | IDENTIFIED COMPONENT | 0.50 (=σ(0)) |
| 10 | (-40, -7.5, -20), (-40, -7.5, 20) | G2 | (116.9, 280.7), (52.3, 320.4) | (HIDDEN LINE) | ---------- | ---------- |
| 11 | (6, -28.5, -20), (6, -28.5, 20) | G2 | (249.0, 385.8), (198.0, 441.9) | UNIDENTIFIED PAIR | UNIDENTIFIED COMPONENT | 0.50 (=σ(0)) |
| 12 | (-40, -44.5, -20), (-40, -44.5, 20) | G3 | ---------- | ---------- | ---------- | ---------- |
| 13 | (-40, -44.5, 20), (-40, -7.5, 20) | G3 | ---------- | ---------- | ---------- | ---------- |
| 14 | (-40, -44.5, -20), (-40, -7.5, -20) | G3 | ---------- | ---------- | ---------- | ---------- |
| 15 | (40, -7.5, -20), (6, 28.5, 20) | G3 | ---------- | (HIDDEN LINE) | ---------- | ---------- |

FIG. 16

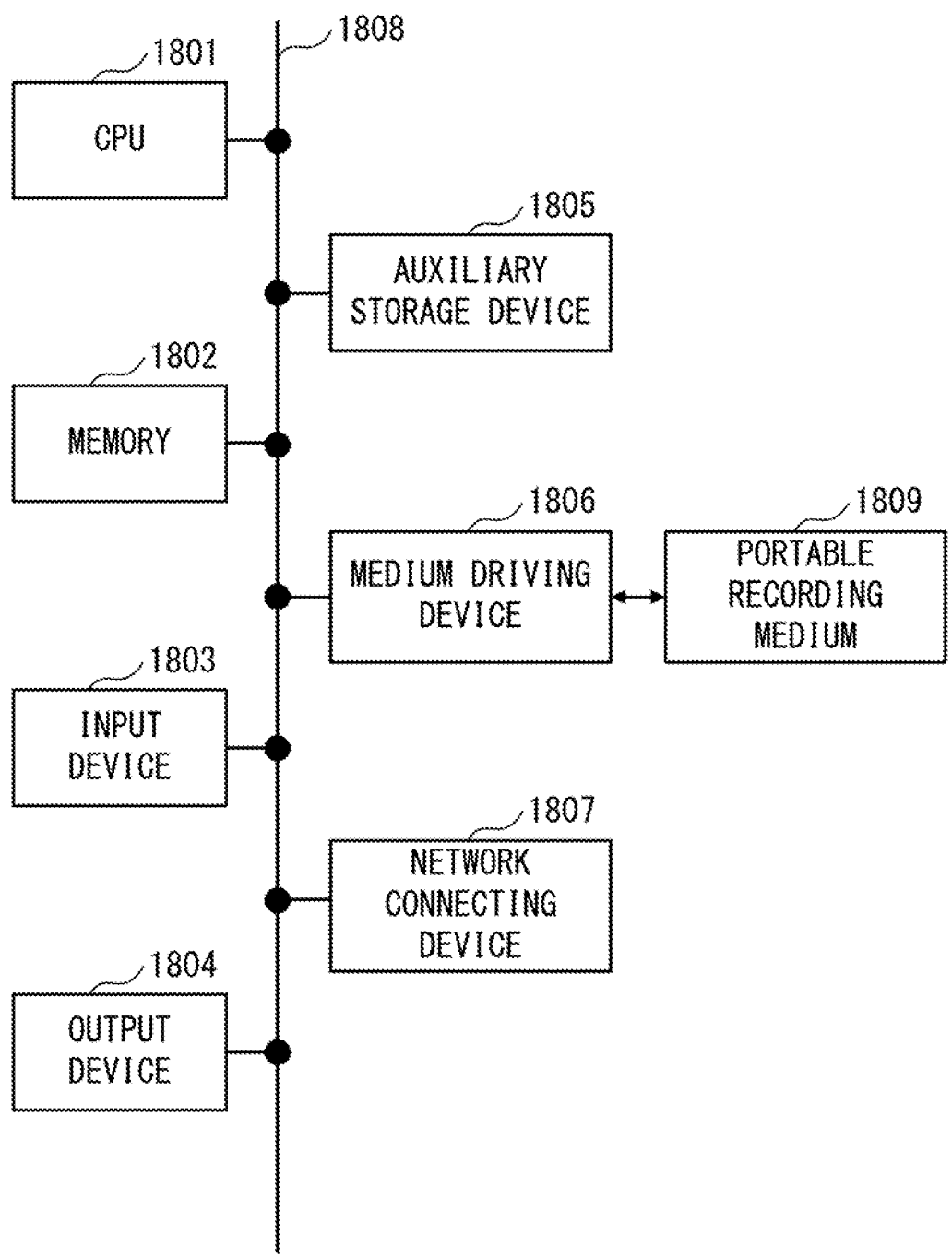
F I G. 18

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2018-203641, filed on Oct. 30, 2018, the entire contents of which are incorporated herein by reference.

FIELD

The embodiments discussed herein are related to an image processing apparatus and an image processing method.

BACKGROUND

Tasks for manufacturing products or structures are performed in a working site such as a factory or a construction site. In such a working site, the progress of a manufacturing process is managed in accordance with, for example, a result of observation of products or structures.

Regarding management of the progress of a manufacturing process, a device for displaying assembly situation information of an article is known (see, for example, patent document 1). Regarding an augmented reality system, a method for determining a data model designed to be overlaid on an image of an object is known (see, for example, patent document 2). A facility-dismantling-operation management assistance system for grasping and managing the progress of a facility dismantling operation is known (see, for example, patent document 3).

Techniques pertaining to line segment detection, pose estimation from line correspondences, camera calibration, robust regression methods for computer vision, machine perception of three-dimensional solids, and the like are known (see, for example, non-patent documents 1-5).

Patent, document 1: Japanese Laid-open Patent Publication No. 2017-68849

Patent document 2: Japanese Laid-open Patent Publication No. 2007-207251

Patent document 3: Japanese Laid-open Patent Publication No. 2009-210403

Non-patent document 1: R. G. Gioi et al., "LSD: a Line Segment Detector", Image Processing On Line, 2 (2012), pp. 35-55, March 2012

Non-patent document 2: C. Xu et al., "Pose Estimation from Line Correspondences: A Complete Analysis and a Series of Solutions", IEEE Transactions on Pattern Analysis and Machine Intelligence, Vol. 39, No. 6, pp. 1209-1222, June 2017

Non-patent document 3: Z. Zhang, "A Flexible New Technique for Camera Calibration", IEEE Transactions on Pattern Analysis and Machine Intelligence, Vol. 22, No. 11, pp. 1330-1334, November 2000

Non-patent document 4: P. Meer et al., "Robust Regression Methods for Computer Vision: A Review", International Journal of Computer Vision, Vol. 6, Issue 1, pp. 59-70, April 1991

Non-patent document 5: L. G. Roberts, "Machine perception of three-dimensional solids", MIT Lincoln Lab. Rep., TR3315, pp. 1-82, May 1963

SUMMARY

According to an aspect of the embodiments, an image processing apparatus includes a memory and a processor coupled to the memory. The memory stores shape information representing a shape of an object. The processor detects a plurality of feature lines from an image of the object that has been captured by an image capturing device in a manufacturing process of manufacturing the object and produces a plurality of combinations by correlating each of a plurality of line segments included in the shape information and each of the plurality of feature lines with each other.

Subsequently, the processor performs classification of each of the combinations into an identified combination that has a certain correlation result or an unidentified combination that has an uncertain correlation result. The processor changes a result of the classification for the identified combination and the unidentified combination according to a reliability of each of the plurality of combinations and determines a degree of progress of the manufacturing process by using the identified combination included in the changed result of the classification.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an error calculation method based on an area;

FIG. 9 illustrates a classification result before change;

FIG. 11 illustrates reliabilities calculated from a classification result;

FIG. 16 illustrates reliabilities calculated using part information;

FIG. 18 is a hardware configuration diagram of an information processing apparatus.

DESCRIPTION OF EMBODIMENTS

Figure 1:
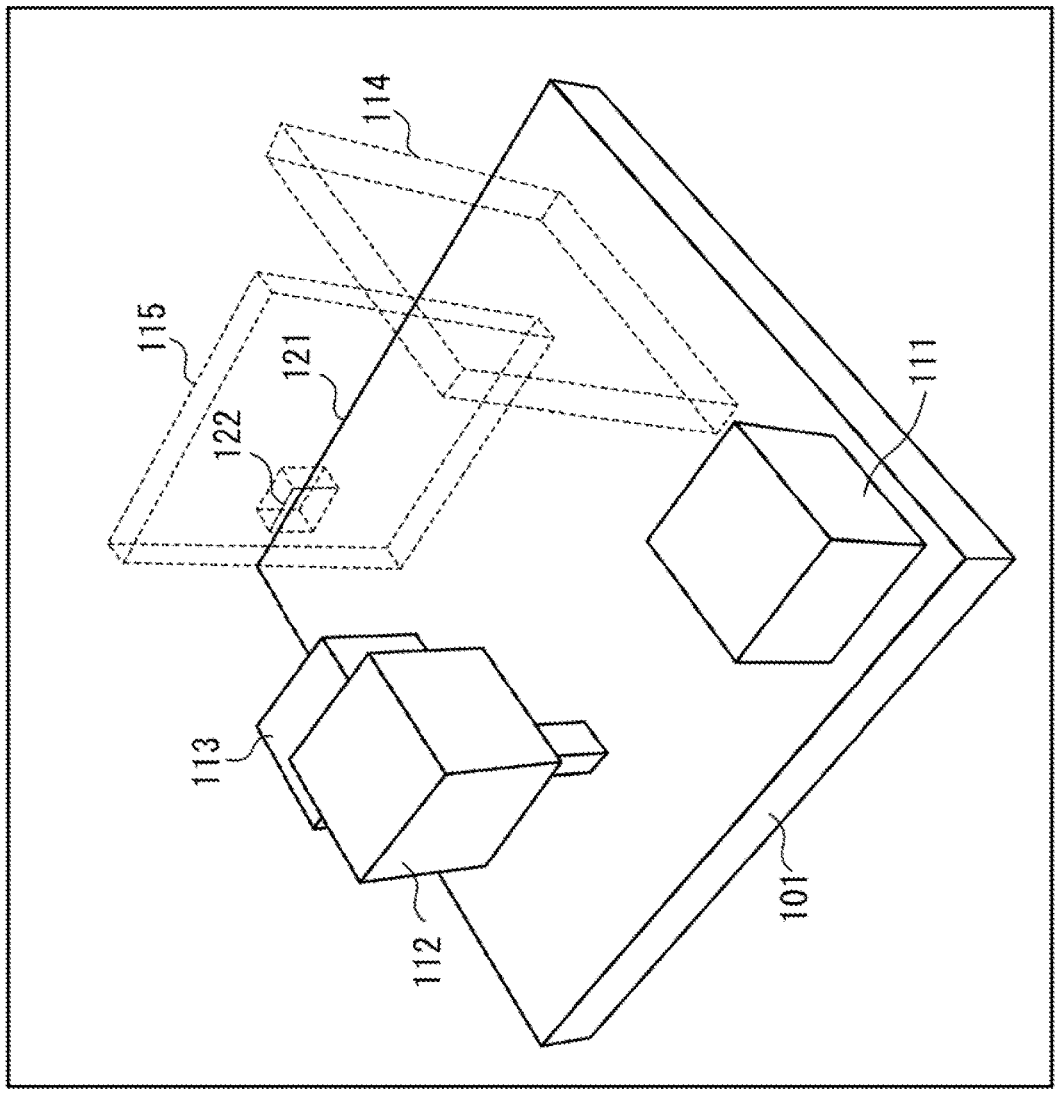
FIG. 1 illustrates an image of a product.

The following describes embodiments in detail by referring to the drawings.

The technique described in document 1 allows three-dimensional computer-aided design (CAD) data of an article to be displayed on the screen of a display device in a manner such that this CAD data is overlaid on a two-dimensional digital image of this article. However, even when CAD data is displayed in such a manner as to be overlaid on an image of an article, it will be still difficult to accurately grasp the progress of the task of assembling the article.

When on-site workers and a supervisor are located at positions physically distant from each other in a manufacturing process for, for example, a ship, a vehicle, or electronic equipment, allowing the progress of the task to be automatically managed at a remote location will offer convenience to the supervisor. When quantitative data indicating the progress can be automatically acquired, such a type of data can be maintained as an objective evidence in addition to a task record prepared by an on-site worker.

In order to allow the progress of a task to be automatically managed, for example, the technique described in Japanese Patent Application No. 2018-46251, which is a prior application, may be used to overlay CAD data of a completed product (finished product) on an image of a product in the process of being manufactured. This method is such that the progress can be grasped according to combinations (correlation pairs) of three-dimensional line segments (3D line segments) included in CAD data and two-dimensional feature lines detected from an image.

However, a product in the process of being manufactured does not always include all parts of a finished product. In this case, a feature line detected from an image could be mistakenly correlated with a 3D line segment of a part, that does not belong to the product, thereby leading to an error in the progress grasped from correlation pairs. It would be difficult to accurately grasp the progress of the task while excluding the correlation pair correlated with the part that does not belong to the product.

FIG. 1 illustrates an example of an image of a product in the process of being assembled. When the product depicted in FIG. 1 is completely assembled, this product will include a base member 101 and parts 111-115. In the situation depicted in FIG. 1, the parts 111-113 have been attached to the base member 101. CAD data of the finished product is overlaid on the image depicted in FIG. 1 so as to correlate 3D line segments with feature lines within the image.

In FIG. 1, the 3D line segments of the base member 101 and the parts 111-113 are omitted, and the 3D line segments of the parts 114 and 115, which have not been attached to the base member 101, are indicated by broken lines. In this case, the progress of the assembling task can be estimated from the total length of 3D line segments correlated with feature lines within the image from among all of the 3D line segments of the base member 101 and the parts 111-115.

When a feature line 121 is detected from an image of the base member 101, the feature line 121 could be mistakenly correlated with a 3D line segment 122 of the part 115 because the feature line 121 is located close to the 3D line segment 122. In this case, the length of the 3D line segment 122 is counted as the length of a 3D line segment of an assembled part, thereby decreasing the accuracy in calculation of the progress.

Such a problem could arise not only when managing the progress of the task of assembling an article by using CAD data but also when managing the progress of the process of manufacturing an object by using another type of shape information.

Figure 2:
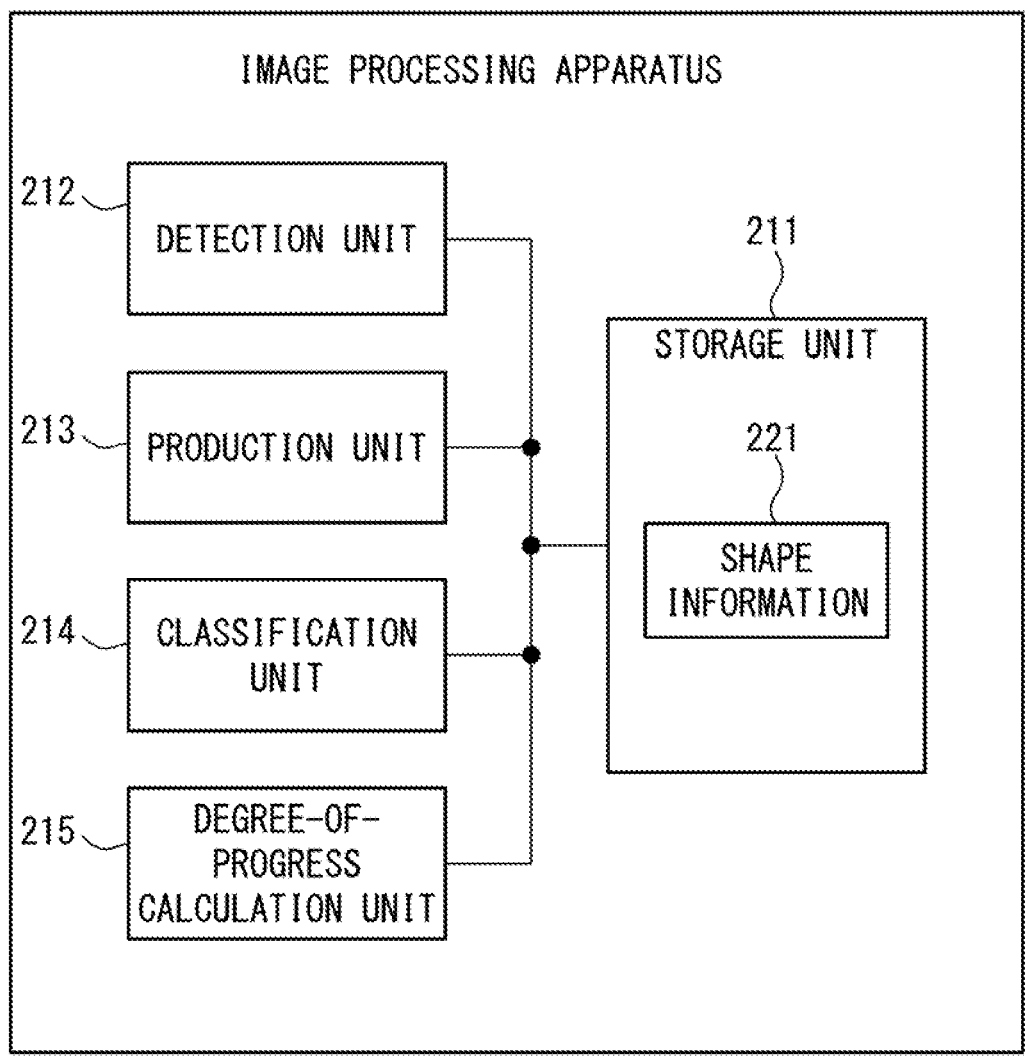
FIG. 2 is a functional configuration diagram of an image processing apparatus.

FIG. 2 is an example of the functional configuration of an image processing apparatus in accordance with embodiments An image processing apparatus 201 depicted in FIG. 2 includes a storage unit 211, a detection unit 212, a production unit 213, a classification unit 214, and a degree-of-progress calculation unit 215. The storage unit 211 stores shape information 221 representing the shape of an object.

Figure 3:
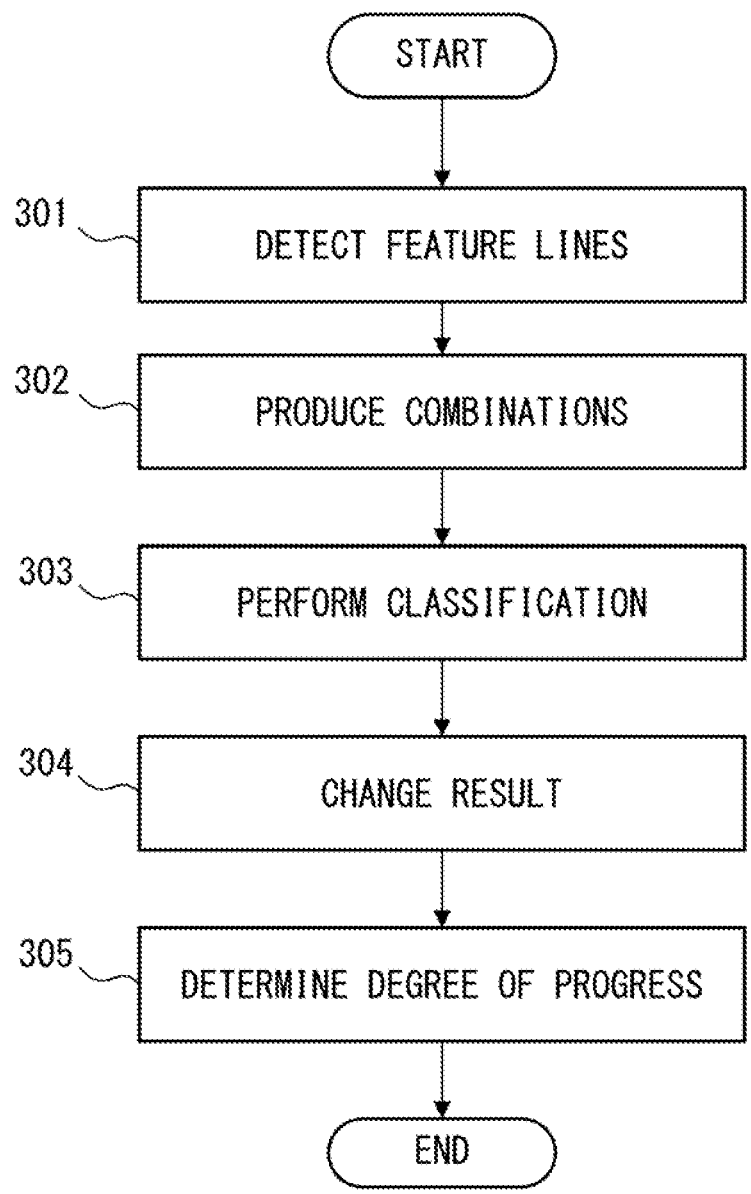
FIG. 3 is a flowchart of image processing.

FIG. 3 is a flowchart indicating an example of image processing performed by the image processing apparatus 201 depicted in FIG. 2. The detection unit 212 detects a plurality of feature lines from an image of the object captured by an image capturing device in a manufacturing process of manufacturing the object (step S301). The production unit 213 produces a plurality of combinations by correlating each of a plurality of line segments included in shape information 221 with each of the plurality of feature lines (step 302).

The classification unit 214 performs classification of each of the combinations into an identified combination that has a certain correlation result or an unidentified combination that has an uncertain correlation result (step 303). The degree-of-progress calculation unit 215 changes a result of the classification for the identified combination and the unidentified combination according to a reliability of each of the plurality of combinations (step 304) and determines a degree of progress of the manufacturing process by using the identified combination included in the changed result of the classification (step 305).

The image processing apparatus 201 depicted in FIG. 2 allows the progress of a task to be objectively grasped using shape information of an object in the process of manufacturing this object.

Figure 4:
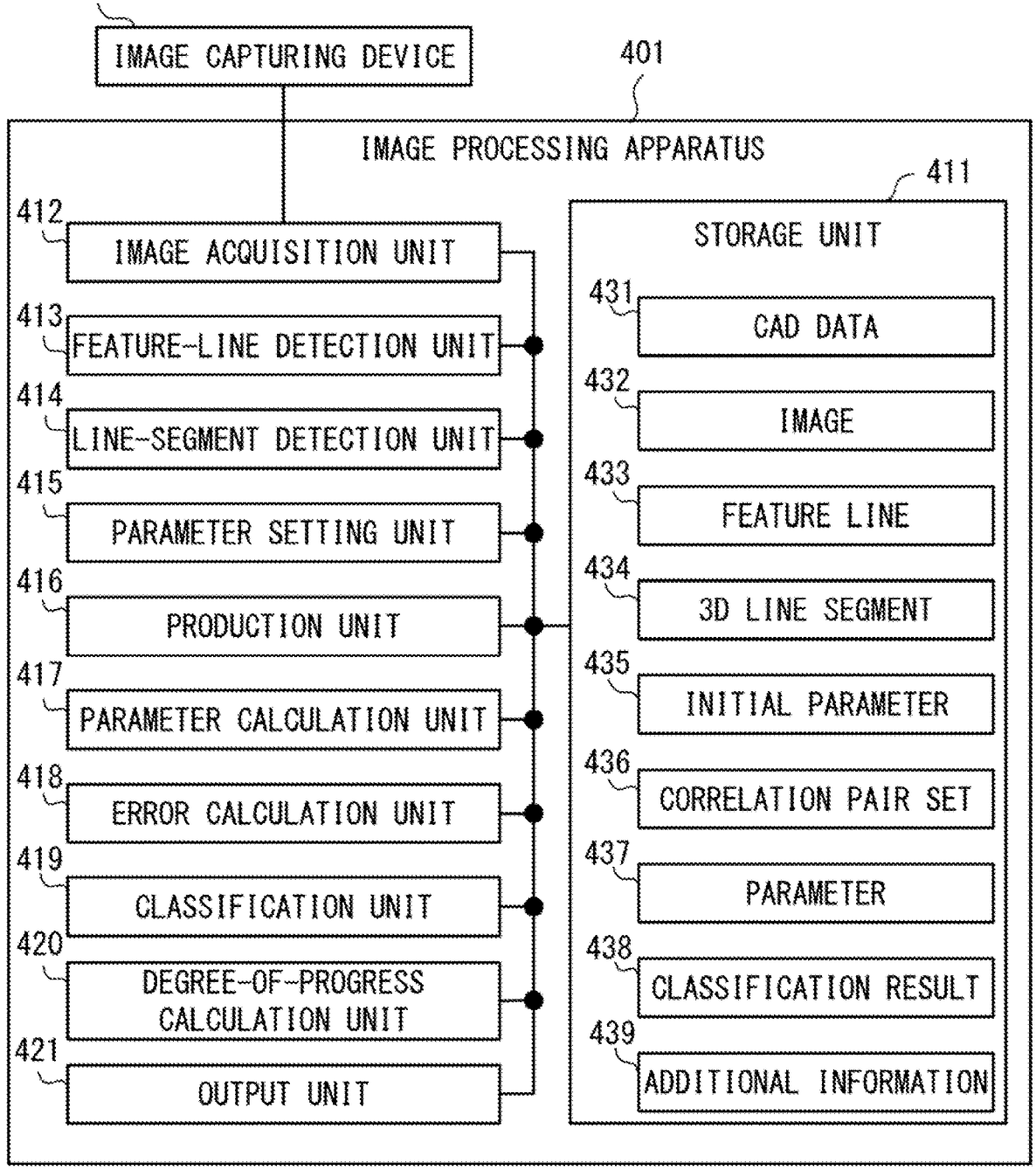
FIG. 4 is a functional configuration diagram illustrating a specific example of an image processing apparatus.

FIG. 4 illustrates a specific example of the image processing apparatus 201 depicted in FIG. 2. An image processing apparatus 401 depicted in FIG. 4 includes a storage unit 411, an image acquisition unit 412, a feature-line detection unit 413, a line-segment detection unit 414, a parameter setting unit 415, a production unit 416, a parameter calculation unit 417, and an error calculation unit 418. The image processing apparatus 401 further includes a classification unit 419, a degree-of-progress calculation unit 420, and an output unit 421.

The storage unit 411, the feature-line detection unit 413, the production unit 416, the classification unit 419, and the degree-of-progress calculation unit 420 respectively correspond to the storage unit 211, the detection unit 212, the production unit 213, the classification unit 214, and the degree-of-progress calculation unit 215 depicted in FIG. 2.

The image processing apparatus 401 is used to manage the progress of the process of manufacturing objects such as products or structures in a factory, a construction site, or the like. The product may be a ship, a vehicle, or electronic equipment. The structure may be a road, a bridge, or a building. The image processing apparatus 401 may be a portable terminal device such as a tablet, a notebook personal computer (PC), or a smart device or may be an information processing apparatus such as a desktop PC.

The storage unit 411 stores CAD data 431. CAD data 431 corresponds to the shape information 221 depicted in FIG. 2 and includes vertex information of a plurality of vertexes representing the three-dimensional shape of an object and line segment information of a plurality of line segments. Vertex information includes the three-dimensional coordinates of each vertex of an object. Line segment information includes identification information indicating vertexes at both ends of each line segment or the three-dimensional coordinates of vertexes at both ends of each line segment. CAD data 431 may be data in OBJ format.

An image capturing device 402 is, for example, a camera that includes an imaging element such as a charge-coupled device (CCD) or a complementary metal-oxide-semiconductor (CMOS) and captures an image 432 of an object represented by CAD data 431. The image acquisition unit 412 acquires the image 432 from the image capturing device 402 and stores this image in the storage unit 411.

The feature-line detection unit 413, the line-segment detection unit 414, the parameter setting unit 415, the production unit 416, the parameter calculation unit 417, and the error calculation unit 418 perform, for example, the image processing described in the above-described prior application.

The feature-line detection unit 413 performs an edge detection process to detect a plurality of edge lines from the image 432 and stores the detected edge lines in the storage unit 411 as feature lines 433. For example, the feature-line detection unit 413 may detect edge lines from the image 432 by using the technique described in non-patent document 1. The line-segment. detection unit 414 detects a plurality of line segments included in CAD data 431 and stores these detected line segments in the storage unit 411 as a plurality of 3D line segments 434.

The parameter setting unit 415 sets an initial parameter 435 representing the initial position and initial posture of the image capturing device 402 within a three-dimensional space. The parameter setting unit 415 displays, on a screen, the image 432 and the shape of an object represented by CAD data 431 in a manner such that this shape is projected onto the image 432.

An on-site worker performs, on the screen, an operation of changing the position and posture of the shape of the displayed object in a manner such that the position and posture of this shape approximate those of the object indicated by the image 432. Changing the position and posture of the shape on the screen will change the position and posture of a viewpoint with reference to the screen. Accordingly, the parameter setting unit 415 uses, as the initial position and initial posture of the image capturing device 402, the position and posture of a viewpoint that corresponds to the position and posture of the shape that has been determined by the on-site worker. Then, the parameter setting unit 415 stores a parameter representing the initial position and the initial posture in the storage unit 411 as an initial parameter 435.

The initial position and initial posture represented by the initial parameter 435 are provisional ones and are not always the same as the position and posture of the image capturing device 402 at the time of capturing the image 432.

Next, the on-site worker designates k combinations of projection lines and feature lines (k is a prescribed integer equal to or higher than 4) among the projection lines corresponding to the 3D line segments 434 and the feature lines 433 that are displayed on the screen. The production unit 416 uses, as initial correlation pairs, combinations of 3D line segments represented by the designated projection lines and the designated feature lines. In this case, k initial correlation pairs are produced.

Using the k initial correlation pairs, the parameter calculation unit 417 calculates the position and posture of the image capturing device 402 at the time of capturing the image 432. For example, using the technique described in non-patent document 2, the parameter calculation unit 417 may calculate, from the k initial correlation pairs, a rotating matrix R with 3 rows and 3 columns and a translation vector T that represent the position and the posture.

The production unit 416 projects the 3D line segments 434 onto the image 432 by using the position and posture of the image capturing device 402 calculated by the parameter calculation unit 417, thereby producing projection lines. For example, the production unit 416 may project the 3D line segments 434 onto the image 432 in accordance with the following formula.

$$\begin{pmatrix} u \\ v \\ 1 \end{pmatrix} = A \begin{pmatrix} R & T \\ 0 & 1 \end{pmatrix} \begin{pmatrix} X \\ Y \\ Z \\ 1 \end{pmatrix} \quad (1)$$

Definitions of (X, Y, Z), A, R, T, and (u, v) in formula (1) are as follows:
(X, Y, Z): Three-dimensional coordinates of an end of a 3D line segment
A: Internal parameter of the image capturing device 402
R: Rotating matrix with 3 rows and 3 columns
T: Translation vector
(u, v): Two-dimensional coordinates of an end of a projection line on the image 432

For example, the internal parameter A of the image capturing device 402 may be measured in advance using the technique described in non-patent document 3.

Next, the production unit 416 selects, from the produced projection lines, projection lines corresponding to additional 3D line segments to be added to the initial correlation pairs, selects, from the feature lines 433, additional feature lines to be correlated with the additional 3D line segments, and produces additional correlation pairs by correlating the additional 3D line segments with the additional feature lines. The production unit 416 stores a set of the initial correlation pairs and the additional correlation pairs in the storage unit 411 as a correlation pair set 436. Accordingly, the correlation pair set 436 includes N correlation pairs, where N is equal to or greater than k+1.

For example, the production unit 416 may select projection lines corresponding to the additional 3D line segments in an order starting from the longest projection line and select, as additional feature lines, feature lines that satisfy the following conditions among the selected projection lines.
(C1) Distance between midpoints of projection line and feature line<Threshold
(C2) Angle formed by projection line and feature line<Threshold An upper limit may be set for the number of additional feature lines. Two or more feature lines that are not continuous with each other may be detected from one side of an object, and accordingly when two or more feature lines exist on a straight line, the production unit 416 may select only one of these feature lines as an additional feature line. In addition, the production unit 416 may exclude a feature line having a length less than a prescribed value from additional feature line candidates. For example, the prescribed value may be 5-20% of the length of the longest feature line.

Next, the parameter calculation unit 417 selects k correlation pairs from among the N correlation pairs included in the correlation pair set 436 and calculates the position and posture of the image capturing device 402 by using the selected k correlation pairs. The parameter calculation unit 417 stores a parameter representing the calculated position and posture in the storage unit 411 as a parameter 437. For example, R and T in formula (1) may be used as the parameter 437.

The parameter calculation unit 417 performs the process of calculating the parameter 437 a plurality of times, wherein every time this process is performed, a different set of k correlation pairs is selected. Every time the parameter 437 is calculated, the error calculation unit 418 uses R and T represented by the parameter 437 so as to project 3D line segments included in the N−k correlation pairs remaining in the correlation pair set 436 onto the image 432, thereby producing N−k projection lines.

Next, the error calculation unit 413 calculates an error between the position of each of the produced projection lines and the position of the feature line included in the corresponding correlation pair and calculates a statistic for the errors calculated for the N−k correlation pairs. The statistic calculated for errors may be a median value, an average value, or a minimum value.

FIG. 5 illustrates an example of an error calculation method based on the area of a region between a projection line and a feature line. When a line segment 501 is a projection line corresponding to a 3D line segment included in the i-th correlation pair (i=1 to N−k) among N−k correlation pairs and a line segment 502 is a feature line included in the i-th correlation pair, line segments 503 and 504 linking the ends of the line segment 501 to the ends of the line segment 502 may be defined. In this case, an area Ai that is the area of a region surrounded by the line segments 501-504 may be used as an error Ei between the position of the projection line and the position of the feature line.

$$Ei=Ai \quad (2)$$

A smaller area A1 will result in a smaller error Ei. The error Ei is 0 when the line segments 501 and 502 overlap one another.

Figure 6:
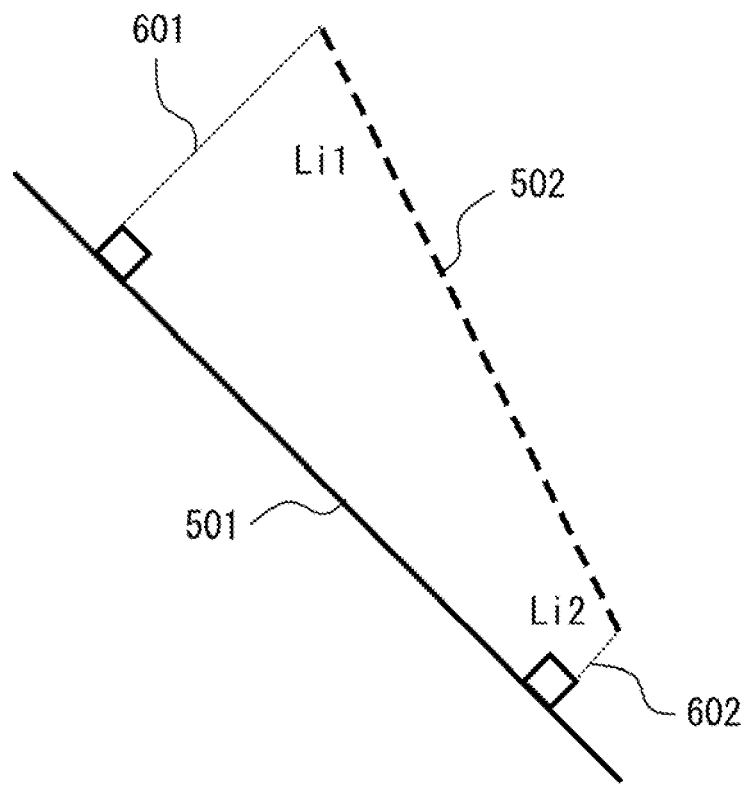
FIG. 6 illustrates an error calculation method based on a distance.

FIG. 6 illustrates an example of an error calculation method based on the distance between a projection line and a feature line. Let Li1 and Li2 respectively indicate the lengths of perpendiculars 601 and 602 extending from the two ends of the line segment 502 to the line segment 501. In this case, the sum of Li1 and Li2 may be used as the error Ei.

$$Ei=Li1+Li2 \quad (3)$$

As Li1 and Li2 become shorter, the error Ei becomes smaller. The error Ei is 0 when the line segments 501 and 502 overlap one another.

The error calculation unit 418 determines the minimum value of the statistic calculated for the errors by using the individual parameters 437 and calculates a threshold TH for the errors by using the determined minimum value. For example, when a median value med of the N−k errors is used as the statistic, the error calculation unit 418 may calculate the threshold TH from a standard deviation σ in accordance with the following formulae by using the technique described in non-patent document 4.

$$TH=2.5*\sigma \quad (4)$$

$$\sigma=C*\{1+(5/(N-k))\}*(\text{med})^{1/2} \quad (5)$$

$$C=1.4826 \quad (6)$$

Next, the classification unit 419 selects a parameter 437 used in calculating the minimum value of the statistic and uses the selected parameter 437 so as to project the 3D line segments included in the correlation pair set 436 onto the image 432 again, thereby producing projection lines. The classification unit 419 calculates an error between the position of each of the produced projection lines and the position of a feature line included in the corresponding correlation pair and classifies correlation pairs that have an error less than the threshold TH as a correctly correlated correlation pair (a correct correlation pair).

Correlation pairs that have an error greater than the threshold TH may possibly include not only a correlation pair representing a defective portion of the shape of the object that could be caused by, for example, a mistake in the manufacture but also an incorrectly correlated correlation pair (incorrect correlation pair). In this case, it will be desirable that incorrect correlation pairs be excluded from the correlation pairs that have an error greater than the threshold TH so as to extract only correlation pairs that correspond to defective portions.

Accordingly, the classification unit 419 extracts, as to-be-assessed correlation pairs, correlation pairs that have an error greater than the threshold TH from the correlation pair set 436. According to the state of connections between a 3D line segment included in a to-be-assessed correlation pair and a 3D line segment included in another correlation pair, the classification unit 419 classifies the to-be-assessed correlation pair as a defective portion of the shape of the object, an incorrect correlation pair, or an unidentified pair.

Correlation pairs classified as a correct correlation pair, a defective portion, or an incorrect correlation pair are identified pairs representing an identified combination that has a certain correlation result. Unidentified pairs represent an unidentified combination that has an uncertain correlation result.

When, for example, the distance between the ends of two feature lines is less than a prescribed value, the classification unit 419 determines that these feature lines are connected to each other. When, for example, the distance between the ends is greater than the prescribed value, the classification unit 419 determines that the feature lines are not connected to each other. Similarly, when the distance between the ends of two 3D line segments i.s less than a prescribed value, the classification unit 419 determines that these 3D line segments are connected to each other. When the distance between the ends is greater than a prescribed value, the classification unit 419 determines that these 3D line segments are not connected to each other.

The to-be-assessed correlation pairs may each be classified as an identified pair or an unidentified pair according to the state of connections between the 3D line segment included in the to-be-assessed correlation pair and the 3D line segment included in another correlation pair, so that correlation pairs that have an uncertain correlation result can be specified. In addition, the identified pairs may be classified as a defective portion or an incorrect correlation pair, so that correlation pairs representing defective portions of the shape of the object that could be caused by, for example, a mistake in the manufacture can be specified and presented to the on-site worker or the supervisor.

For example, the classification unit 419 may classify a to-be-assessed correlation pair according to the following determination standards.

(P1) The classification unit 419 selects, as another correlation pair, a correlation pair that includes a feature line connected to a feature line included in a to-be-assessed correlation pair or a correlation pair that includes a 3D line segment connected to a 3D line segment included in the to-be-assessed correlation pair. When the correlation pair set 436 does not include such a correlation pair, the classification unit 419 classifies the to-be-assessed correlation pair as an unidentified pair.

(P2) When the feature line and 3D line segment included in the to-be-assessed correlation pair are connected to the feature line and 3D line segment included in the selected other correlation pair, the classification unit 419 classifies the to-be-assessed correlation pair as a defective portion.

(P3) When only one of the feature line or 3D line segment included in the to-be-assessed correlation pair is connected to the feature line or 3D line segment included in the selected other correlation pair, the classification unit 419 classifies the to-be-assessed correlation pair as an incorrect correlation pair.

Figure 7:
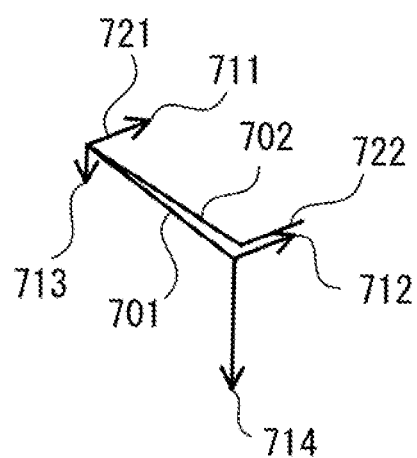
FIG. 7 illustrates a correlation pair representing a defective portion of the shape of an object.

FIG. 7 illustrates an example of a correlation pair representing a defective portion of the shape of an object. In FIG. 7, a to-be-assessed correlation pair includes a 3D line segment represented by a projection line 701 and a feature line 702. Projection lines 711-714 are projection lines that correspond to 3D line segments connected to a 3D line segment represented by the projection line 701. A feature line 721 is the feature line of a correlation pair that includes a 3D line segment represented by the projection line 711. A feature line 722 is the feature line of a correlation pair that includes a 3D line segment represented by the projection line 712.

First, the classification unit 419 selects, as another correlation pair, a correlation pair that includes a 3D line segment connected to the 3D line segment included in the to-be-assessed correlation pair. Accordingly, a correlation pair that includes the feature line 721 and a correlation pair that includes the feature line 722 are selected as the other correlation pairs. As the feature line 702 included in the to-be-assessed correlation pair is connected to the feature lines 721 and 722, the to-be-assessed correlation pair is classified as a defective portion.

Figure 8:
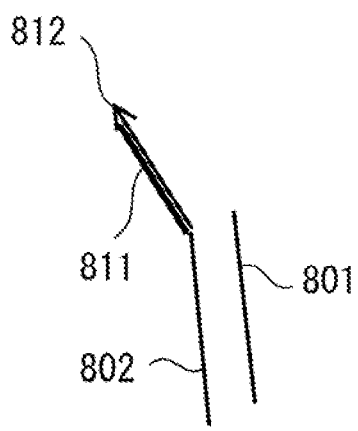
FIG. 8 illustrates an incorrect correlation pair.

FIG. 8 illustrates an example of an incorrect correlation pair. In FIG. 8, a to-be-assessed correlation pair includes a 3D line segment represented by a projection line 801 and a feature line 802. A feature line 811 is connected to the feature line 802. A projection line 812 is a projection line that corresponds to the 3D line segment of a correlation pair that includes the feature line 811.

First, the classification unit 419 selects, as another correlation pairs, a correlation pair that includes a feature line connected to the feature line 802 included in the to-be-assessed correlation pair. Accordingly, a correlation pair that includes the feature line 811 is selected as the other correlation pair. As the 3D line segment included in the to-be-assessed correlation pair is not connected to the 3D line segment included in the other correlation pair, the to-be-assessed correlation pair is classified as an incorrect correlation pair.

For example, when the determination standards (P1)-(P3) are used, the classification unit 419 may classify to-be-assessed correlation pairs through the following classification process:

```
// Determination of the connection state for the vicinity of
to-be-assessed correlation pair
for all to-be-assessed correlation pairs
    TP = To-be-assessed correlation pair
    flagPairing=False
    flagDefect=False
    for all 3D line segments connected to 3D line segment of
TP
        if correlation pair OP that includes {3D line segment
connected to 3D line segment of TP} is present
            flagPairing=True
            if feature line of OP and feature line of TP are
connected
                flagDefect=True
            end
        end
    end
```

-continued

```
    for all 3D feature lines connected to feature line of TP
        if correlation pair OP that includes {feature line
connected to feature line of TP} is present
            flagPairing=True
            if 3D line segment of OP and 3D line segment of TP
are connected
                flagDefect=True
            end
        end
    end
    // Determination of defective portion, incorrect
correlation pair, or unidentified pair
    if ((flagPairing==True)&&(flagDefect==True))
        TP=Correlation pair that corresponds to defective
portion
    else if ((flagPairing==True)&&(flagDefect==False))
        TP=Incorrect correlation pair
    else if (flagPairing==False)
        TP=Unidentified pair
    end
end
```

The classification process is such that when the distance between an end of the feature line of OP and an end of the feature line of TP is equal to or less than a threshold D, it is determined that these feature lines are connected to each other. When the distance is greater than the threshold D, it is determined that the feature line of OP and the feature line of TP are not connected to each other.

When the distance between an end of a projection line representing the 3D line segment of OP and an end of a projection line representing the 3D line segment of TP is equal to or less than the threshold D, it is determined that these 3D line segments are connected to each other. When the distance is greater than the threshold D, it is determined that the 3D line segment of OP and the 3D line segment of TP are not connected to each other. For example, the threshold D may be a value within a range from 1 to 10 pixels. The threshold D may be several pixels.

The classification unit 419 produces a classification result 438 for N correlation pairs within the correlation pair set 438 and stores this result in the storage unit 411.

The degree-of-progress calculation unit 420 calculates the degree of progress of the manufacturing process according to the ratio of the total of the lengths of the 3D line segments included in the identified pairs included in the classification result 438 to the total of the lengths of the 3D line segments included in the N correlation pairs within the correlation pair set 436. For example, the degree-of-progress calculation unit 420 may calculate an identified portion PX [%] and an unidentified portion PY [%] of the degree of progress in accordance with the following formulae.

$$PX=(LL1/LL0)*100 \qquad (11)$$

$$PY=(LL2/LL0)*100 \qquad (12)$$

LL0 represents the total of the lengths of all of the 3D line segments included in the N correlation pairs excluding hidden lines, i.e., lines that are not observed by the image capturing device 402. LL1 represents the total of the lengths of the 3D line segments included in the identified pairs (correct correlation pairs, correlation pairs that correspond to defective portions, or incorrect correlation pairs). LL2 represents the total of the lengths of the 3D line segments included in the unidentified pairs.

The identified portion PX represents a degree of progress calculated according to a certain correlation result. The unidentified portion PY represents an increase in the degree of progress that is calculated according to an uncertain correlation result. The identified portion PX may be deemed as the lower limit of the degree of progress. PX+PY may be deemed as the upper limit, of the degree of progress.

The degree of progress can be quantitatively grasped using the ratio of the total of the lengths of the 3D line segments included in identified pairs or unidentified pairs to the total of the lengths of the 3D line segments included in a plurality of correlation pairs.

Next, the degree-of-progress calculation unit 420 determines a reliability for each correlation pair by using additional information 439 such as time series information, multiple-viewpoint information, part information, or process information. The reliability is an indicator of the likelihood of being an identified pair.

The time series information represents correlation pairs included in correlation pair sets 436 produced at a plurality of points in time. A correlation pair continuously included in the correlation pair sets 436 produced at a plurality of points in time is highly likely to be actually present. Accordingly, for a particular 3D line segment correlated with the same feature line for a longer time, the degree-of-progress calculation unit 420 sets a higher reliability for the correlation pair that includes these 3D line segment and feature line.

The multiple-viewpoint information represents a correlation pair observed from a plurality of viewpoints at the same point in time. A correlation pair that has a correlation result consistent for a plurality of viewpoints is highly likely to be actually present. Accordingly, the degree-of-progress calculation unit 420 determines a presence range in which the feature line of a correlation pair observed from a viewpoint VP1 may possibly be present when being observed from another viewpoint VP2, and sets a high reliability for this correlation pair when the noted feature line is present within the presence range.

When an object includes a plurality of parts, the part information represents correlation pairs belonging to the individual parts. When many correlation pairs belong to a particular part, this part is highly likely to be actually present. Accordingly, the degree-of-progress calculation unit 420 specifies, for each of the correlation pairs, a part to which the 3D line segment included in the correlation pair belongs; and the more identified pairs include 3D line segments belonging to the specified part, the higher reliability the degree-of-progress calculation unit 420 sets for the correlation pairs.

When an object includes a plurality of parts each having a rank that depends on an assembling order, the process information represents a correlation pair belonging to an assembled part. A correlation pair belonging to an assembled part is highly likely to be actually present. A correlation pair belonging to a part yet to foe assembled is highly unlikely to be actually present. Accordingly, the degree-of-progress calculation unit 420 specifies an assembled part according to a calculated degree of progress and sets a high reliability for a correlation pair that includes a 3D line segment belonging to the specified part.

Next, the degree-of-progress calculation unit 420 changes the classification result 438 according to the reliably of each correlation pair and recalculates the degree of progress of the manufacturing process according to the changed classification result 438. The output unit 421 outputs the recalculated degree of progress. The output unit 421 may output both the identified portion PX and unidentified portion PY of the degree of progress or may output the identified portion PX alone.

The correlation pair set 436 produced from the image 432 not only includes identified pairs that have a certain correlation result, such as correct correlation pairs, correlation pairs that correspond to defective portions, and incorrect correlation pairs, but also includes unidentified pairs that have an uncertain correlation result. For example, a correlation pair of the 3D line segment 122 and the feature line 121 depicted in FIG. 1 is not connected to any of the other correlation pairs and thus classified as an unidentified pair.

However, increasing the reliability of an unidentified pair by using additional information 439 allows this unidentified pair to be reclassified as a correct correlation pair or a correlation pair that corresponds to a defective portion. In this case, the unidentified pair with an increased reliability may be treated as an identified pair so as to decrease the number of unidentified pairs, thereby allowing the degree of progress to be determined with higher accuracy.

For example, when the reliability is determined using the time series information as additional information 439, the production unit 416 may perform the process of producing a correlation pair set 436 a plurality of times in the manufacturing process, and the classification unit 419 may perform the process of classifying the correlation pairs of the correlation pair set 436 a plurality of times. The degree-of-progress calculation unit 420 determines the reliability of each correlation pair according to the number of times the correlation pair has been classified as an identified pair and the number of times the correlation pair has been classified as an unidentified pair.

FIG. 9 illustrates an example of a classification result before change that is stored in the storage unit 411 in an initial classification process. The classification result 438 in FIG. 9 includes line-segment IDs, line-segment coordinates, feature-line coordinates, correlation results, degrees of identification, and reliabilities.

A line-segment ID is identification information of a 3D line segment, included in the correlation pair set 436. Line-segment coordinates represent the three-dimensional coordinates of the start point and endpoint of a 3D line segment, i.e., the two ends of this 3D line segment. The individual coordinate value represents a distance [mm] from the origin to the start point or the end point within a three-dimensional space. Feature-line coordinates represent the two-dimensional coordinates of the start point and end point of a feature line correlated with a 3D line segment, i.e., the two ends of this feature line. The individual coordinate value represents a distance (pixel counts) from the origin to the start point or the end point on the image 432.

A correlation result represents a result of correlating a 3D line segment and a feature line. "Correct correlation" represents a correct correlation pair, "mistake in manufacture" represents a correlation pair that corresponds to a defective portion, and "mistake in correlation" represents an incorrect correlation pair. "(Hidden line)" represents a correlation pair that corresponds to a hidden line that is not observed from the position of the image capturing device 402 when the manufacturing of an object has been completed. A feature line that corresponds to a hidden line may be detected from an image 432 of an object in the process of being manufactured. For example, the classification unit 419 may determine whether a 3D line segment is a hidden line by using the technique described in non-patent document 5.

A degree of identification is flag information indicating which of an identified pair or an unidentified pair a correlation pair is. An identified component indicates an identified pair, and an unidentified component indicates an unidentified pair. A correlation pair that corresponds to a hidden line is not classified as an identified pair or an unidentified pair.

A reliability is a real number within a range from 0 to 1 that represents the likelihood of being an identified pair. For example, a reliability may be represented by the following sigmoid function σ(t).

$$\sigma(t)=1/(1+e^{(-at)}) \quad (13)$$

e represents the base of natural logarithm, a represents a gain, t represents a variable.

Figure 10:
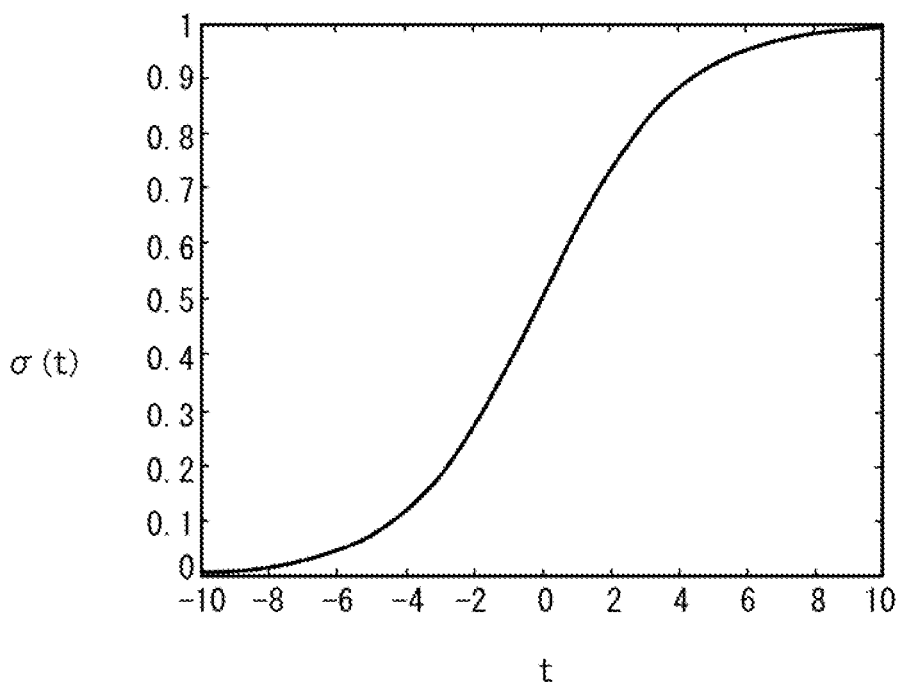
FIG. 10 illustrates a sigmoid function.

FIG. 10 illustrates a sigmoid function, where a=0.5. σ(t) is a monotone increasing function, and σ(0)=0.5 is satisfied. 0<σ(t)<0.5 is satisfied, where t<0. 0.5<σ(t)<1 is satisfied, where t>0.

In the example depicted in FIG. 9, the reliabilities of correlation pairs that include 3D line segments with line-segment ID "1", line-segment ID "2", line-segment IDs "5" to "9", and line-segment ID "11" have seen set to 0.5, i.e., an initial value. However, no reliabilities have been set for correlation pairs that correspond to "(hidden line)" and 3D line segments that are not correlated with a feature line.

A degree of progress specific to the classification result 438 depicted in FIG. 9 is calculated as follows by using formulae (11) and (12).

$$PX=(429.09/633.66)*100=67.7\% \quad (14)$$

$$PY=(90.56/633.66)*100=14.2\% \quad (15)$$

When a reliability is determined using the time series information, the value t1 in the following formula may be used as the variable t in formula (13).

$$t1=\text{num1}-\text{num2} \quad (16)$$

num1 represents the cumulative number of times a 3D line segment included in a correlation pair has been judged to be an identified component when the classification process is repeatedly performed. num2 represents the cumulative number of times the 3D line segment included in a correlation pair has been judged to be an unidentified component when the classification process is repeatedly performed. Note that the initial value of t1 is 0.

Assume, for example, that the classification process is performed three times, wherein a 3D line segment is judged to be an unidentified component in the first, classification process and is judged to be an identified component in the second and third classification processes. In this case, num1=2 and num2=1 are satisfied. Accordingly, t1 is calculated as follows by using formula (16).

$$t1=2-1=1 \quad (17)$$

After the first classification process is performed, t1 in formula (16) may be 1 or −1. After the second classification process is performed, t1 may be 2, 0, or −2. After the third classification process is performed, t1 may be 3, 1, −1, or −3. Similarly, also when the classification process is performed four or more times, t1 may be one of discrete integers.

FIG. 11 illustrates examples of reliabilities calculated from the classification result 438 depicted in FIG. 9. num1 and num2 are respectively 1 and 0 for line-segment IDs "1", "2", "5", "6", "8", and "9", and hence t1=1 is satisfied. In this case, when the sigmoid function σ(t) with a=0.5 is used, a reliability σ(t1) is 0.62. Meanwhile, num1 and num2 are respectively 0 and 1 for line-segment IDs "7" and "11", and hence t1=−1 is satisfied and the reliability σ(t1) is 0.37.

Determining reliabilities by using the time series information allow's the reliabilities of correlation pairs that are continuously included in correlation pair sets 436 produced at a plurality of points in time to be increased.

The degree-of-progress calculation unit 420 changes a degree of identification according to the reliability of each correlation pair. For example, when the reliability of a correlation pair that corresponds to an identified component is lower than 0.5, the degree-of-progress calculation unit 420 changes the degree of identification of this correlation pair from "identified component" to "unidentified component".

When the reliability of a correlation pair that corresponds to an unidentified component is greater than 0.5, the degree-of-progress calculation unit 420 changes the degree of identification of this correlation pair from "unidentified component" to "identified component" and compares an error specific to this correlation pair with a threshold THC. The threshold THC is a value higher than the threshold TH.

When the error is greater than the threshold THC, the degree-of-progress calculation unit 420 changes the correlation result of the correlation pair to "defective portion". When the error is less than the threshold THC, the degree-of-progress calculation unit 420 changes the correlation result of the correlation pair to "correct correlation pair". A high reliability means that a correlation pair is highly likely to be actually present, and hence the correlation result will not be changed to "incorrect correlation pair".

Next, the degree-of-progress calculation unit 420 recalculates the identified portion PX and unidentified portion PY of the degree of progress by using correlation pairs corresponding to identified components (identified pairs) and correlation pairs corresponding to unidentified components (unidentified pairs) that are included in the classification result 438 after the change. In the example of FIG. 11, the reliabilities of all of the correlation pairs corresponding to identified components are greater than 0.5 and the reliabilities of all of the correlation pairs corresponding to unidentified components are less than 0.5, and hence the degree of identification is not changed for any of these correlation pairs. Accordingly, the results of calculation of the identified portion PX and the unidentified portion PY are the same as those obtained from formulae (14) and (15).

Even when on-site workers and a supervisor are located at positions physically distant from each other in a manufacturing process for an object, the image processing apparatus 401 depicted in FIG. 4 allows the progress of the task to be objectively grasped by quantitatively measuring the degree of progress of the manufacturing process.

The output unit 421 may output the degree of progress as well as information on identified pairs classified as defective portions. Accordingly, before the manufacturing of the object is completed, defective portions of the shape of the object that could be caused by, for example, a mistake in the manufacture can be presented to the on-site workers or the supervisor as identified pairs that have a certain correlation result. Hence, a mistake in the manufacture can be found early, thereby decreasing the cost for the recovering task of correcting the defective portions.

In this case, the classification unit 419 may calculate, in accordance with the following formula, an amount of deviation Err that an identified pair classified as a defective portion has within the three-dimensional space.

$$\text{Err}=(LA/LB)*h \quad (18)$$

LA [mm] represents a length that the 3D line segment included in the identified pair has within the three-dimensional space. LB represents the length (pixel count) of a projection line that corresponds to this 3D line segment. h represents the average of the lengths (pixel counts) of individual perpendiculars extending on the image 432 from the two ends of the feature line included in the identified pair to the projection line. The output unit 421 outputs the amount of deviation Err as information on the identified pair classified as a defective portion.

Figure 12:
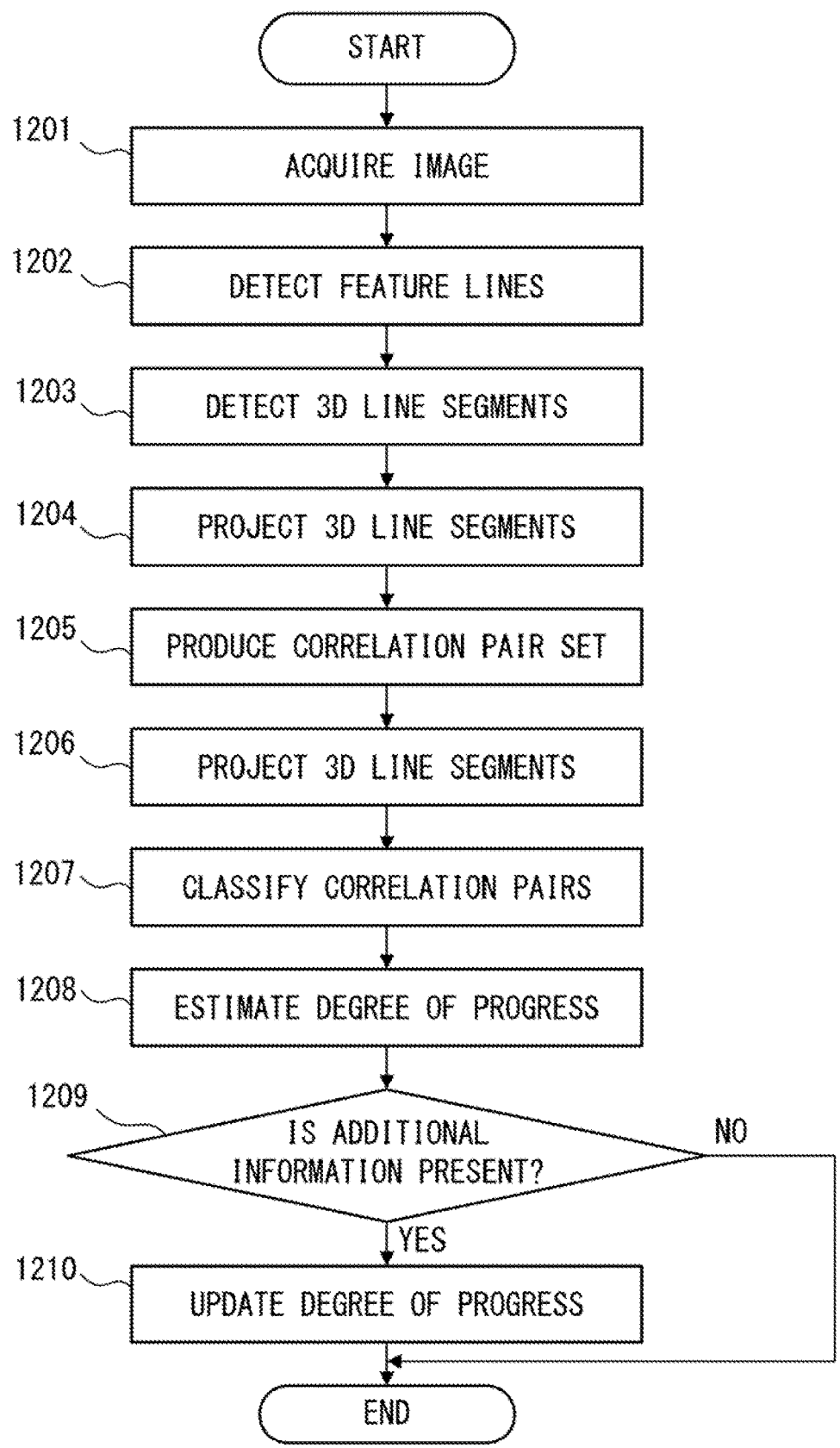
FIG. 12 is a flowchart illustrating a specific example of image processing.

FIG. 12 is a flowchart illustrating a specific example of image processing performed by the image processing apparatus 401 depicted in FIG. 4. The image processing depicted in FIG. 12 is performed repeatedly at a plurality of points in time over several days during a process of manufacturing an object. The start date and time of the image processing may be determined before the start of manufacture or designated by the on-site worker or the supervisor after the start of manufacture.

The image acquisition unit 412 acquires an image 432 from the image capturing device 402 (step 1201). The feature-line detection unit 413 detects a plurality of feature lines 433 from the image 432 (step 1202).

The line-segment detection unit 414 detects a plurality of 3D line segments 434 from CAD data 431 (step 1203). The production unit 416 produces projection lines by projecting the 3D line segments 434 onto the image 432 (step 1204) and produces a correlation pair set 436 (step 1205).

Using a parameter 437 calculated by the parameter calculation unit 417, the classification unit 419 produces projection lines by projecting 3D line segments included in the correlation pair set 436 onto the image 432 (step 1206). The classification unit 419 classifies the correlation pairs by comparing an error between the position of the projection line and the position of the feature line with the threshold TH, thereby producing a classification result 438 (step 1207). In the case of the classification result 438 in FIG. 9, a line-segment ID, line-segment coordinates, feature-line coordinates, and a correlation result are recorded for each correlation pair in step 1207.

The degree-of-progress calculation unit 420 estimates the degree of progress according to the classification result 438 (step 1208) and checks whether additional information 439 is present (step 1209). When additional information 439 is present (step 1209, YES), the degree-of-progress calculation unit 420 updates the degree of progress by using the additional information 439 (step 1210). When additional information 439 is not present (step 1209, NO), the image processing apparatus 401 ends the processing.

Figure 13:
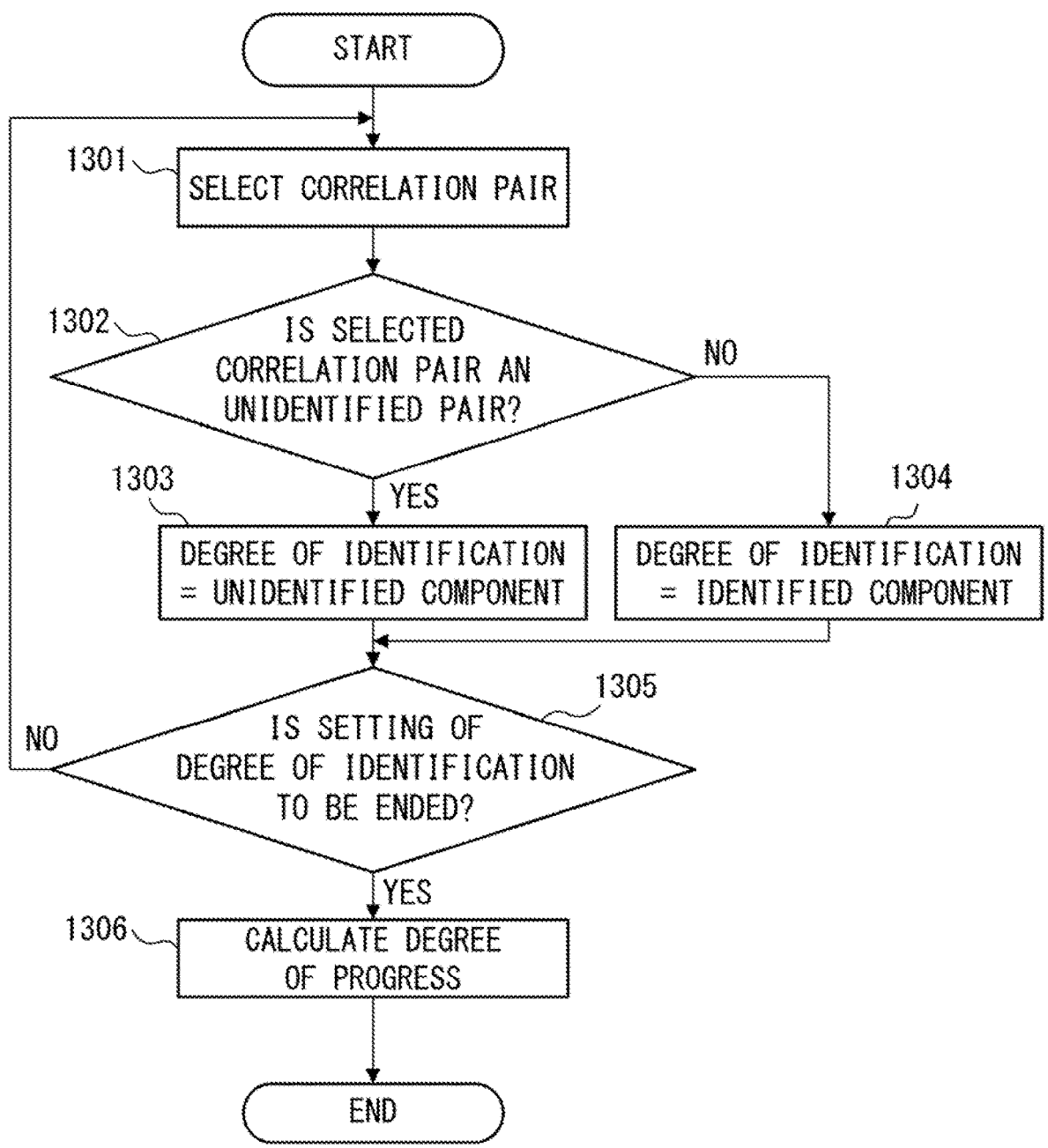
FIG. 13 is a flowchart of a degree-of-progress estimation process.

FIG. 13 is a flowchart illustrating an example of the degree-of-progress estimation process in step 1208 in FIG. 12. The degree-of-progress calculation unit 420 selects, from a classification result 438, a correlation pair having a correlation result that is not "(hidden line)" as a target correlation pair (step 1301) and checks the correlation result of the target correlation pair (step 1302).

When the correlation result is "unidentified pair" (step 1302, YES), the degree-of-progress calculation unit 420 sets "unidentified component" as the degree of identification of the target correlation pair (step 1303). When the correlation result is "correct correlation pair", "correlation pair corresponding to defective portion", or "incorrect correlation pair" (step 1302, NO), the degree-of-progress calculation unit 420 sets "identified component" as the degree of identification of the target correlation pair (step 1304). In the case of the classification result 438 depicted in FIG. 9, the degree of identification of the target, correlation pair is recorded in step 1303 or 1304, and a corresponding reliability is set as an initial value.

The degree-of-progress calculation unit 420 determines whether to end the setting of degrees of identification (step 1305). The degree-of-progress calculation unit 420 determines to end the setting of degrees of identification when all correlation pairs having correlation results that are not "(hidden line)" have been selected. The degree-of-progress calculation unit 420 determines to not end the setting of degrees of identification when at least one correlation pair having a correlation result that is not "(hidden line)" has not been selected yet.

When the setting of degrees of identification is not ended (step 1305, NO), the degree-of-progress calculation unit 420 performs again the processes of step 1301 and the following steps for a next correlation pair. When the setting of degrees of identification is ended (step 1305, YES), the degree-of-progress calculation unit 420 calculates the identified portion PX and unidentified portion PY of the degree of progress by using formulae (11) and (12) (step 1306).

Figure 14:
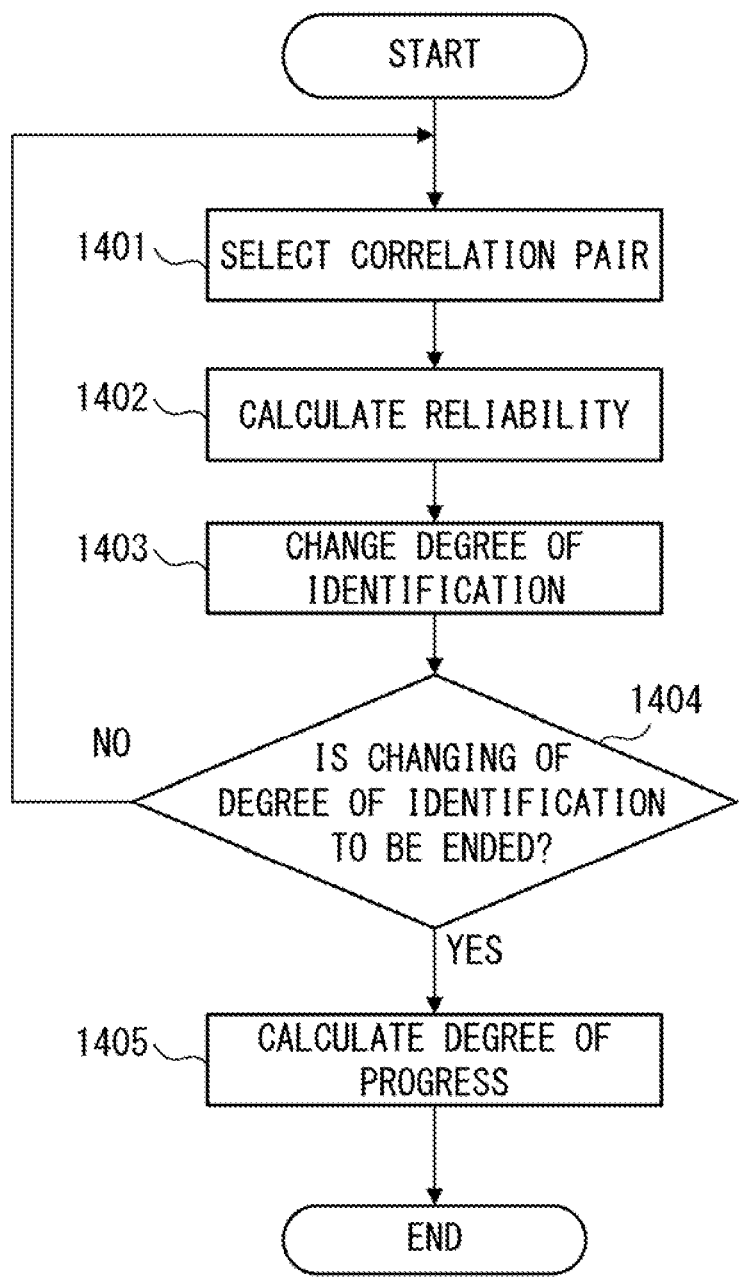
FIG. 14 is a flowchart of a degree-of-progress update process.

FIG. 14 is a flowchart illustrating an example of the degree-of-progress update process in step 1210 in FIG. 12. The degree-of-progress calculation unit 420 selects, from a classification result 438, a correlation pair having a correlation result that is not "(hidden line)" as a target correlation pair (step 1401) and calculates the reliability of the target correlation pair (step 1402).

The degree-of-progress calculation unit 420 changes the degree of identification of the target correlation pair according to the calculated reliability (step 1403). In the case of the classification result 438 depicted in FIG. 9, the reliability of the target correlation pair is changed into the calculated reliability in step 1402, and the degree of identification of the target correlation pair is changed in step 1403.

The degree-of-progress calculation unit 420 determines whether to end the changing of degrees of identification (step 1404). The degree-of-progress calculation unit 420 determines to end the setting of degrees of identification when all correlation pairs having correlation results that are not "(hidden line)" have been selected. The degree-of-progress calculation unit 420 determines to not end the setting of degrees of identification when at least one correlation pair having a correlation result that is not "(hidden line)" has not been selected yet.

When the changing of degrees of identification is not ended (step 1404, NO), the degree-of-progress calculation unit 420 performs again the processes of step 1401 and the following steps for a next correlation pair. When the changing of degrees of identification is ended (step 1404, YES), the degree-of-progress calculation unit 420 calculates the identified portion PX and unidentified portion PY of the degree of progress by using formulae (11) and (12) (step 1405).

The following describes an embodiment in which a reliability is determined using multiple-viewpoint information, part information, or process information as additional information 439.

When a reliability is determined using the multiple-viewpoint information, the image acquisition unit 412 acquires and stores images of an object captured at a plurality of different positions in the storage unit 411 as images 432. In this case, images of the object maybe captured by a plurality of image capturing devices 402 located at a plurality of positions surrounding the object or may be captured by moving one image capturing device 402. The position of each of the image capturing devices 402 corresponds to the viewpoint thereof. The internal parameter A of each of the image capturing devices 402 is measured in advance.

The feature-line detection unit 413 detects a plurality of feature lines 433 from the images 432 captured from the individual viewpoints. The degree-of-progress calculation unit 420 selects a reference viewpoint from the viewpoints in turn and selects the viewpoints other than the reference viewpoint as supplemental viewpoints.

For example, when the image capturing devices 402 are located at viewpoints O1, O2, and O3, first, the viewpoint O1 may be set as the reference viewpoint, and the viewpoints O2 and O3 may be set as supplemental viewpoints. Then, the viewpoint O2 may be set as the reference viewpoint, and the viewpoints O1 and O3 may be set as supplemental viewpoints. Finally, the viewpoint O3 may be set as the reference viewpoint, and the viewpoints O1 and O2 may be set as supplemental viewpoints.

The degree-of-progress calculation unit 420 checks whether each of visible 3D line segments, i.e., 3D line segments that are not hidden lines, among the 3D line segments included in the correlation pairs produced from an image 432 captured from a reference viewpoint, can be viewed from a supplemental viewpoint. When the 30 line segment can be viewed from both the reference viewpoint and the supplemental viewpoint, the degree-of-progress calculation unit 420 determines a presence range in which a feature line that corresponds to the 3D line segment is present within an image 432 captured from the supplemental viewpoint. According to whether the feature line has been detected from the presence range, the degree-of-progress calculation unit 420 determines the reliability of the corresponding correlation pair.

The presence range within the image 432 captured from the supplemental viewpoint, i.e., the range in which the feature line that corresponds to the 3D line segment is present, may be determined according to, for example, epipolar geometry. The epipolar geometry is intended to reconstruct three-dimensional depth information from images captured from two different viewpoints.

Figure 15:
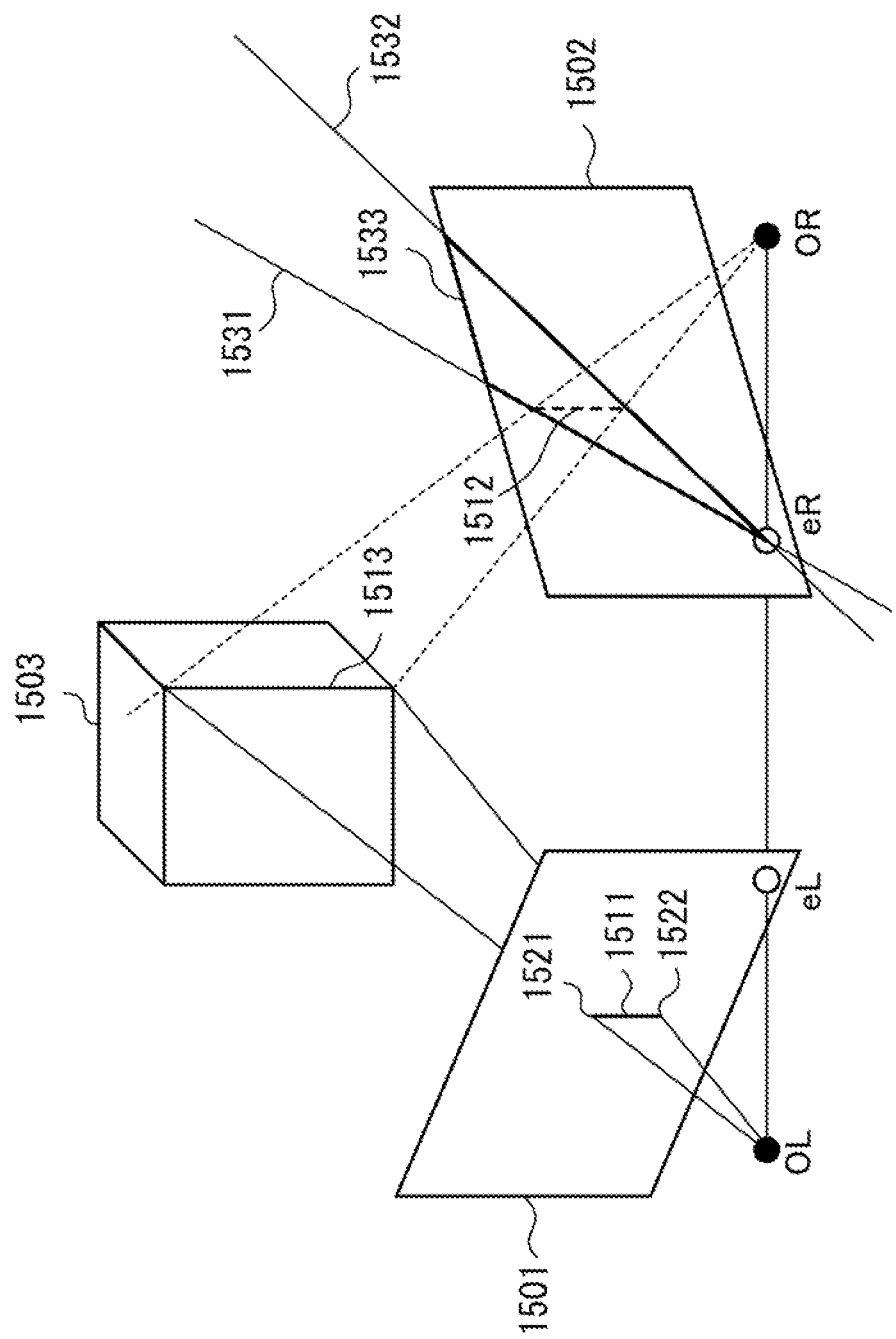
FIG. 15 illustrates epipolar geometry.

FIG. 15 illustrates an example of the epipolar geometry. Assume that a reference camera is an L camera and a supplemental camera is an R camera. In this case, a viewpoint OL of the L camera is a reference viewpoint, and a viewpoint OR of the R camera is a supplemental viewpoint. A point eL obtained by projecting the viewpoint OR of the R camera onto an image plane 1501 of the L camera and a point eR obtained by projecting the viewpoint OL of the L camera onto an image plane 1502 of the R camera are referred to as epipoles.

A contour line 1513 representing the shape of an object 1503 within a three-dimensional space is presented as a line segment 1511 on the image plane 1501. Projecting a straight line through the viewpoint OL and an endpoint 1521 of the line segment 1511 onto the image plane 1502 provides an epipolar line 1531. Similarly, projecting a straight line through the viewpoint OL and an endpoint 1522 of the line segment 1511 onto the image plane 1502 provides an epipolar line 1532. One of the L camera and the R camera can be viewed from the other camera. The viewpoint OR of the R camera is projected onto the epipole eL, and the viewpoint OL of the L camera is projected onto the epipole eR.

Due to limitations pertaining to the eipolar geometry, a line segment 1512 indicating the contour line 1513 that is presented on the image plane 1502 is present within a triangular region surrounded by the epipolar line 1531, the epipolar line 1532, and a perimeter 1533 of the image plane 1502.

Accordingly, the degree-of-progress calculation unit 420 defines this triangular region as a presence region in which a feature line that corresponds to a 3D line segment is present. When both of the two ends of the feature line correlated with the 3D line segment, among the feature lines within an image 432 captured from the supplemental viewpoint, are included in the presence region, the degree-of-progress calculation unit 420 determines that the 3D line segment is present and increments a presence number num3 by one. When only one of or neither of the two ends of the feature line correlated with the 3D line segment is included in the presence range, the degree-of-progress calculation unit 420 determines that the 3D line segment is not present and increments a non-presence number num4 by one.

The degree-of-progress calculation unit 420 selects a reference viewpoint in turn so as to repeatedly update the presence number num3 or non-presence number num4 for all combinations of reference viewpoints and supplemental viewpoints. In this case, the value t2 in the following formula may be used as the variable t in formula (13).

$$t2 = num3 - num4 \qquad (21)$$

The initial value of t2 is 0. t2 is maximized when a 3D line segment can be viewed from all viewpoints and both ends of a feature line are included in a presence range. t2 is minimized when the 3D line segment can be viewed from all viewpoints and only one of or neither of the ends of the feature line is included in the presence range. For example, when the total number of viewpoints is 3, the maximum value and minimum value of t2 may be 6 and −6, respectively. In reality, a 3D line segment becomes visible or invisible in accordance with the structure of the object, and hence t2 also varies according to the object structure.

Determining a reliability by using the multiple-viewpoint information allows the reliability of a correlation pair that has a correlation result consistent for a plurality of viewpoints to be increased.

When an object includes a plurality of parts and reliabilities are determined using the part information, the degree-of-progress calculation unit 420 specifies a part to which a 3D line segment included in each correlation pair belong The degree-of-progress calculation unit 420 determines the reliability of the correlation pair according to the number of identified pairs that include a 3D line segment belonging to the specified part.

In this case, a part ID is assigned to each part included in the object, and the value t3 in the following formula may be used as the variable t in formula (13).

$$t3 = num5 - num6 \qquad (22)$$

num5 represents the number of identified pairs that include any of the 3D line segments of the part to which the 3D line segment included in each correlation pair belongs, and num6 represents a common parameter set for the correlation pairs of this part. For example, num6 may be set according to the number of visible 3D line segments among the 3D line segments belonging to the part. In this case, num6 may be half the number of visible 3D line segments belonging to the same part (the fractional portion is dropped). The initial value of t3 is 0.

FIG. 16 illustrates examples of reliabilities calculated using the part information. The classification result 438 depicted in FIG. 16 includes part IDs in addition to the items depicted in FIG. 9. A part ID, which is identification information of a part to which 3D line segments belong, is extracted from CAD data 431 and recorded in the classification result 438 together with a line-segment ID and line-segment coordinates. For example, the part ID of a part to which 3D line segments with line-segment IDs "1" to "6" belong may be "G1", and the part ID of a part to which 3D line segments with line-segment IDs "7" to "11" belong may be "G2".

Correlation pairs with a reliability set as "identified component" among the correlation pairs with part ID "G1"

correspond to line-segment IDs "1", "2", "5", and "6". Accordingly, num5 is 4 for these correlation pairs. Visible 3D line segments having correlation results that are not "(hidden line)" among the 3D line segments with part ID "G1" are 3D line segments with line-segment IDs "1", "2", "5", and "6". num6=2 is satisfied, where num6 is half the number of these visible 3D line segments.

In this situation, t3 is calculated as follows by using formula (22) for identified pairs having part ID "G1".

$$t3=4-2=2 \quad (23)$$

Accordingly, when the sigmoid function σ(t) with a=0.5 is used, a reliability σ(t3) is 0.73.

Correlation pairs with a reliability set as "identified component" among the correlation pairs with part ID "G2" correspond to line-segment IDs "8" and "9". Accordingly, num5 is 2 for these correlation pairs. Visible 3D line segments having correlation results that are not "(hidden line)" among the 3D line segments with part ID "G2" are 3D line segments with line-segment IDs "7" to "9" and "11". num6=2 is satisfied, where num6 is half the number of these visible 3D line segments.

In this situation, t3 is calculated as follows by using formula (22) for identified pairs having part ID "G2".

$$t3=2-2=0 \quad (24)$$

Accordingly, when the sigmoid function σ(t) with a=0.5 is used, a reliability σ(t3) is 0.5.

In the example depicted in FIG. 16, the reliabilities of all of the correlation pairs corresponding to identified components are 0.5 or greater and the reliabilities of all of the correlation pairs corresponding to unidentified components are 0.5, and hence the degree of identification is not changed for any of these correlation pairs. Accordingly, the results of calculation of the identified portion PX and the unidentified portion PY are the same as those obtained from formulae (14) and (15).

Determining reliabilities by using the part information allows a higher reliability to be set for correlation pairs belonging to a part to which more identified pairs belong.

When an object includes a plurality of parts each having a rank that depends on an assembling order and reliabilities are determined using the process information, the degree-of-progress calculation unit 420 determines a provisional degree of progress by using identified pairs included in a classification result 438 before change. The degree of progress calculated in step 1306 in FIG. 13 may be used as the provisional degree of progress.

Next, the degree-of-progress calculation unit 420 specifies a part group that includes parts having ranks within a range from the initial rank to a rank that corresponds to the provisional degree of progress. For each of the correlation pairs, the degree-of-progress calculation unit 420 determines the reliability of the correlation pair according to whether the 3D line segment included in this correlation pair belongs to the specified part group.

Figure 17:
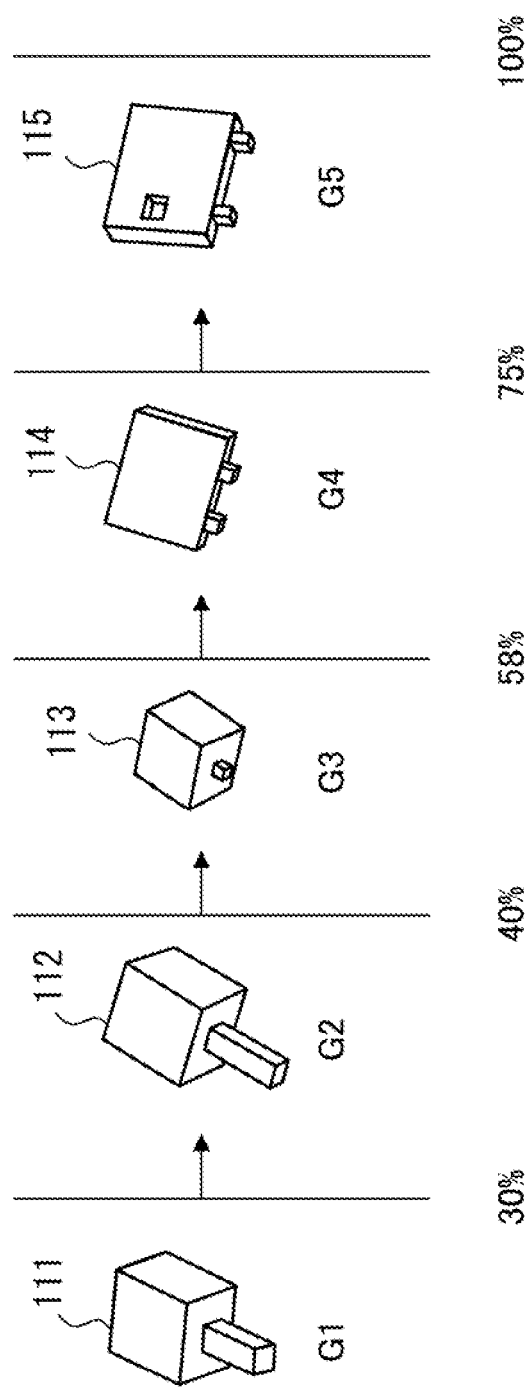
FIG. 17 illustrates a part assembling order.

FIG. 17 illustrates an example of an assembling order for the parts 111-115 depicted in FIG. 1. In this example, the parts 111 to 115 are respectively assigned part IDs "G1" to "G5", and the parts 111, 112, 113, 114, and 115 are attached to the base member 101 in this order. Accordingly, the part 111 has the initial rank, and the part 115 has the last rank.

In this case, a degree of progress at the moment at which each individual part is attached to the base member 101 is recorded in the storage unit 411 as a registered degree of progress in advance. The registered degrees of progress at the moments at which the parts 111, 112, 113, 114, and 115 will be attached are respectively 30%, 40%, 58%, 75%, and 100%.

The degree-of-progress calculation unit 420 specifies a part group belonging to a registered degree of progress within a range from 0% to (X+Y)% by using the degree of progress calculated in step 1306 in FIG. 13. When, for example, X=45 and Y=12, X+Y=57 is satisfied, and hence the parts 111 to 113, which fall within a range from 0% to 57%, are specified as a part group.

In this case, the value t4 in the following formula may be used as the variable t in formula (13).

$$t4=\text{num7} \quad (25)$$

num7=1 is satisfied when the part ID of a part to which the 3D line segment included in each correlation pair belongs is the same as the part ID of any of the parts belonging to a specified part group, and num7=−1 is satisfied when this part ID is not the same as any of the part IDs of the parts belonging to the part group. The initial value of t4 is 0. In consideration of an error in calculation of the degree of progress, the degree-of-progress calculation unit 420 may add, to the part group, a part having the next rank to the range from 0% to (X+Y)%.

Determining reliabilities by using the process information allows a high reliability to be set for correlation pairs belonging to an assembled part.

The degree-of-progress calculation unit 420 can determine a reliability by combining two or more types of information among the time-series information, the multiple-viewpoint information, the part information, and the process information. In this case, the degree-of-progress calculation unit 420 may use the sum of two or more values among t1 to t4 as the variable t in formula (13). For example, when the time-series information, the part information, and the process information are combined, the variable t may be calculated in accordance with the following formula.

$$t=t1+t3+t4 \quad (26)$$

The configuration of the image processing apparatus depicted in FIGS. 2 and 4 is merely an example, and components thereof may be omitted or changed in accordance with the application or conditions of the image processing apparatus. For example, when an image 432 is stored in advance in the storage unit 411 of the image processing apparatus depicted in FIG. 4, the image acquisition unit 412 may be omitted. Another type of shape information representing the shape of an object may be used instead of CAD data 431. The process of manufacturing an object is not limited to assembling a plurality of parts but may be a process of performing tasks excluding the assembling task, such as a task of cutting out an object from a prescribed material.

The flowcharts depicted in FIGS. 3 and 12-14 are merely examples, and processes thereof may be omitted or changed in accordance with the configuration or conditions of the image processing apparatus. For example, when an image 432 is stored in the storage unit 411 in advance, the process of step 1201 in FIG. 12 may be omitted.

The image and 3D line segments depicted in FIG. 1 are merely examples, and an image and 3D line segments are changed in accordance with a subject to be imaged or the configuration or conditions of the image processing apparatus. The error calculation methods depicted in FIGS. 5 and 6 are merely example, and another calculation method may be used in accordance with the configuration or conditions of the image processing apparatus. The correlation pairs representing defective portions in FIG. 7 and the incorrect correlation pairs in FIG. 8 are merely examples, and correlation pairs are changed in accordance with a subject to be imaged or the configuration or conditions of the image processing apparatus.

The classification results in FIGS. 9, 11, and 16 are merely examples, and classification results are changed in accordance with a subject to be imaged or the configuration or conditions of the image processing apparatus. The sigmoid function depicted in FIG. 10 is merely an example, and a sigmoid function without a=0.5 may be used. The degree-of-progress calculation unit 420 may calculate a reliability toy using a monotone increasing function that is not a sigmoid function.

The epipolar lines depicted in FIG. 15 are merely examples, and epipolar lines are changed in accordance with a subject to be imaged and the position of the image capturing device. The assembling order and registered degrees of progress indicated in FIG. 17 are merely examples, and the assembling order and the registered degrees of progress are changed in accordance with parts included in the object.

The calculation formulae (1) to (28) are merely examples, and other calculation formulae may be used in accordance with the configuration or conditions of the image processing apparatus.

FIG. 18 illustrates an example of the hardware configuration of an information processing apparatus (computer) to be used as the image processing apparatus indicated in FIGS. 2 and 4. The information processing apparatus in FIG. 18 includes a central processing unit (CPU) 1801, a memory 1802, an input device 1803, an output device 1804, an auxiliary storage device 1805, a medium driving device 1806, and a network connecting device 1807. These elements are hardware and connected to each other by a bus 1808. The image capturing device 402 depicted in FIG. 4 may be connected to the bus 1808.

The memory 1802 is, for example, a semiconductor memory such as a read only memory (ROM), a random access memory (RAH), or a flash memory, and the memory 1802 stores a program and data to be used for processing. The memory 1802 may be used as the storage unit 211 in FIG. 2 or the storage unit 411 in FIG. 4.

For example, the CPU 1801 (processor) executes a program by using the memory 1802 so as to operate as the detection unit 212, production unit 213, classification unit 214, and degree-of-progress calculation unit 215 depicted in FIG. 2.

The CPU 1801 also executes a program by using the memory 1802 so as to operate as the image acquisition unit 412, feature-line detection unit 413, line-segment detection unit 414, and parameter setting unit 415 depicted in FIG. 4. The CPU 1801 also executes a program by using the memory 1802 so as to operate as the production unit 416, the parameter calculation unit 417, the error calculation unit 416, the classification unit 419, and the degree-of-progress calculation unit 420.

The input device 1803 is, for example, a keyboard or a pointing device and is used to input an instruction or information from an operator or a user. The output device 1804 is, for example, a display device, a printer, or a speaker and is used to output a query or instruction to an operator or a user and a processing result. The processing result may be both the identified portion PX and unidentified portion PY of a degree of progress or may be the identified portion PX alone. The processing result may include information on identified pairs classified as defective portions. The output device 1804 may be used as the output unit 421 depicted in FIG. 4.

The auxiliary storage device 1805 is, for example, a magnetic disk device, an optical disc device, a magneto-optical disk device, or a tape device. The auxiliary storage device 1805 may be a hard disk drive or a flash memory. The information processing apparatus may use a program and data stored in the auxiliary storage device 1805 by loading them into the memory 1802. The auxiliary storage device 1805 may foe used as the storage unit 211 depicted in FIG. 2 or the storage unit 411 depicted in FIG. 4.

The medium driving device 1806 drives a portable recording medium 1809 and accesses items recorded therein. The portable recording medium 1809 is, for example, a memory device, a flexible disk, an optical disc, or a magneto-optical disk. The portable recording medium 1809 may be, for example, a compact disk read only memory (CD-ROM), a digital versatile disk (DVD), and a universal serial bus (USB) memory. An operator or a user may store a program and data in the portable recording medium 1809 and may use the program and the data by loading them into the memory 1802.

As described above, the computer-readable recording medium that stores programs and data to be used for the image processing is a physical (non-transitory) recording medium such as the memory 1802, the auxiliary storage device 1805, or the portable recording medium 1809.

The network connecting device 1807 is a communication interface circuit that is connected to a communication network such as a local area network (LAN) or a wide area network (WAN) and that performs data conversion associated with a communication. The information processing apparatus may receive a program and data from an external apparatus via the network connecting device 1807 and may use the program and the data by loading them into the memory 1802.

The information processing apparatus does not need to include all of the elements in FIG. 18, and some of the elements can be omitted in accordance with an application or conditions. For example, when the portable recording medium 1809 or the communication network is not used, the medium driving device 1806 or the network connecting device 1807 maybe omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An image processing apparatus comprising:
   a memory that stores shape information representing a shape of an object;
   a processor coupled to the memory and the processor configured to:
   detect a plurality of feature lines from an image of the object that has been captured by an image capturing device in a manufacturing process of manufacturing the object;

produce a plurality of combinations by correlating each of a plurality of line segments included in the shape information and each of the plurality of feature lines with each other;

perform classification of each of the plurality of combinations into an identified combination that has a certain correlation result or an unidentified combination that has an uncertain correlation result;

changes a result of the classification for the identified combination and the unidentified combination according to a reliability of each of the plurality of combinations; and determine a degree of progress of the manufacturing process by using the identified combination included in the changed result of the classification.

2. The image processing apparatus according to claim 1, wherein the processor produces a plurality of projection lines by projecting the plurality of line segments onto the image, determines an error between a position of a projection line corresponding to a line segment included in each of the plurality of combinations and a position of a feature line included in each of the plurality of combinations, classifies, into the identified combination, a combination that has an error less than a threshold from among the plurality of combinations, extracts a combination that has an error greater than the threshold from among the plurality of combinations, and classifies, according to a state of connection between a line segment included in an extracted combination and a line segment included in a different combination, the extracted combination into the identified combination or the unidentified combination.

3. The image processing apparatus according to claim 2, wherein the processor classifies, according to the state of connection between the line segment included in the extracted combination and the line segment included in the different combination, the extracted combination into a defective portion of the shape of the object, an incorrectly correlated combination, or the unidentified combination, and defines, as the identified combination, a combination classified into the defective portion of the shape of the object or the incorrectly correlated combination.

4. The image processing apparatus according to claim 1, wherein the processor performs a classification process a plurality of times in the manufacturing process, the classification process being a process of classifying a combination obtained by correlating each of the plurality of line segments included in the shape information and each of the plurality of feature lines detected from the image of the object with each other, and determines the reliability according to a first number of times each of the plurality of combinations has been classified into the identified combination and a second number of times each of the plurality of combinations has been classified into the unidentified combination.

5. The image processing apparatus according to claim 1, wherein:

the image of the object has been captured at a first position; and the processor detects a plurality of feature lines from a different image of the object that has been captured at a second position different from the first position, determines a presence range in which a feature line that corresponds to a line segment included in each of the plurality of combinations is present within the different image, and determines the reliability according to whether the feature line that corresponds to the line segment included in each of the plurality of combinations has been detected from the presence range.

6. The image processing apparatus according to claim 1, wherein:

the object includes a plurality of parts; and the processor specifies a part among the plurality of parts to which a line segment included in each of the plurality of combinations belongs, and determines the reliability according to a number of identified combinations that include a line segment belonging to the specified part.

7. The image processing apparatus according to claim 1, wherein:

the object includes a plurality of parts each having a rank that depends on an assembling order; and the processor determines a provisional degree of progress by using the identified combination included in the result of the classification before changing the result of the classification, specifies a part group that includes a part within a range from an initial rank to a rank that corresponds to the provisional degree of progress, and determines the reliability according to whether a line segment included in each of the plurality of combinations belongs to the part group.

8. The image processing apparatus according to claim 1, wherein the processor determines the degree of progress of the manufacturing process according to a ratio of a total of lengths of line segments included in identified combinations included in the changed result of the classification to a total of lengths of line segments included in the plurality of combinations.

9. An image processing method comprising:

detecting, by a processor, a plurality of feature lines from an image of an object that has been captured by an image capturing device in a manufacturing process of manufacturing the object;

producing, by the processor, a plurality of combinations by correlating each of a plurality of line segments included in shape Information representing a shape of the object and each of the plurality of feature lines with each other;

performing, by the processor, classification of each of the plurality of combinations into an identified combination that has a certain correlation result or an unidentified combination that has an uncertain correlation result;

changing, by the processor, a result of the classification for the identified combination and the unidentified combination according to a reliability of each of the plurality of combinations; and determining, by the processor, a degree of progress of the manufacturing process by using the identified combination included in the changed result of the classification.

10. The image processing method according to claim 9, wherein
the performing classification of each of the plurality of combinations
produces a plurality of projection lines by projecting the plurality of line segments onto the image,
determines an error between a position of a projection line corresponding to a line segment included in each of the plurality of combinations and a position of a feature line included in each of the plurality of combinations,
classifies, into the identified combination, a combination that has an error less than a threshold from among the plurality of combinations,
extracts a combination that has an error greater than the threshold from among the plurality of combinations, and
classifies, according to a state of connection between a line segment included in an extracted combination and a line segment included in a different combination, the extracted combination into the identified combination or the unidentified combination.

11. The image processing method according to claim 10, wherein
the performing classification of each of the plurality of combinations
classifies, according to the state of connection between the line segment included in the extracted combination and the line segment included in the different combination, the extracted combination into a defective portion of the shape of the object, an incorrectly correlated combination, or the unidentified combination, and
defines, as the identified combination, a combination classified into the defective portion of the shape of the object or the incorrectly correlated combination.

12. The image processing method according to claim 9, wherein
the performing classification of each of the plurality of combinations performs a classification process a plurality of times in the manufacturing process, the classification process being a process of classifying a combination obtained by correlating each of the plurality of line segments included in the shape information and each of the plurality of feature lines detected from the image of the object with each other, and
the image processing method further comprises determining the reliability according to a first number of times each of the plurality of combinations has been classified into the identified combination and a second number of times each of the plurality of combinations has been classified into the unidentified combination.

13. The image processing method according to claim 9, wherein
the image of the object has been captured at a first position, and
the image processing method further comprises:
detecting a plurality of feature lines from a different image of the object that has been captured at a second position different from the first position; and
determining a presence range in which a feature line that corresponds to a line segment included in each of the plurality of combinations is present within the different image; and
determining the reliability according to whether the feature line that corresponds to the line segment included in each of the plurality of combinations has been detected from the presence range.

14. The image processing method according to claim 9, wherein
the object includes a plurality of parts, and
the image processing method further comprises:
specifying a part among the plurality of parts to which a line segment included in each of the plurality of combinations belongs; and
determining the reliability according to a number of identified combinations that include a line segment belonging to the specified part.

15. The image processing method according to claim 3, wherein
the object includes a plurality of parts each having a rank that depends on an assembling order, and
the image processing method further comprises:
determining a provisional degree of progress by using the identified combination included in the result of the classification before changing the result of the classification;
specifying a part group that includes a part within a range from an initial rank to a rank that corresponds to the provisional degree of progress; and
determining the reliability according to whether a line segment included in each of the plurality of combinations belongs to the part group.

* * * * *